(12) United States Patent
Murata

(10) Patent No.: US 9,928,185 B2
(45) Date of Patent: Mar. 27, 2018

(54) INFORMATION PROCESSING APPARATUS AND COMPUTER-READABLE RECORDING MEDIUM HAVING PROGRAM RECORDED THEREIN

(71) Applicant: FUJITSU LIMITED, Kawasaki-shi, Kanagawa (JP)

(72) Inventor: Takehiko Murata, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 14/992,071

(22) Filed: Jan. 11, 2016

(65) Prior Publication Data
US 2016/0224482 A1 Aug. 4, 2016

(30) Foreign Application Priority Data

Jan. 30, 2015 (JP) ................. 2015-016471

(51) Int. Cl.
*G06F 12/00* (2006.01)
*G06F 13/24* (2006.01)
*G06F 13/16* (2006.01)
*G06F 3/06* (2006.01)

(52) U.S. Cl.
CPC .............. *G06F 13/24* (2013.01); *G06F 3/065* (2013.01); *G06F 3/067* (2013.01); *G06F 3/0619* (2013.01); *G06F 13/1663* (2013.01)

(58) Field of Classification Search
None
See application file for complete search history.

(56) References Cited

U.S. PATENT DOCUMENTS

| 7,913,009 B2 * | 3/2011 | Vega | G06F 9/4812 |
| | | | 710/106 |
| 2004/0139168 A1 | 7/2004 | Tanaka et al. | |
| 2006/0218328 A1 | 9/2006 | Vega et al. | |
| 2007/0168559 A1 | 7/2007 | Tanaka et al. | |
| 2008/0005794 A1 | 1/2008 | Inoue et al. | |

FOREIGN PATENT DOCUMENTS

| JP | 2002-532806 | 10/2002 |
| JP | 2004-220216 | 8/2004 |
| JP | 2006-216068 | 8/2006 |
| JP | 2008-535099 | 8/2008 |
| WO | 0036509 | 6/2000 |
| WO | 2006022161 | 3/2006 |

* cited by examiner

*Primary Examiner* — Cheng-Yuan Tseng
(74) *Attorney, Agent, or Firm* — Fujitsu Patent Center

(57) ABSTRACT

Processing performance of inter-virtual OS communication is improved by including a first storage processing unit that stores shared data in a data sharing area of a shared memory in a first virtual OS that transmits the shared data, an update determination unit that periodically checks an update state of the data sharing area in a second virtual OS that receives the shared data, and a first read processing unit that reads the shared data from the data sharing area when the data sharing area is updated.

11 Claims, 17 Drawing Sheets

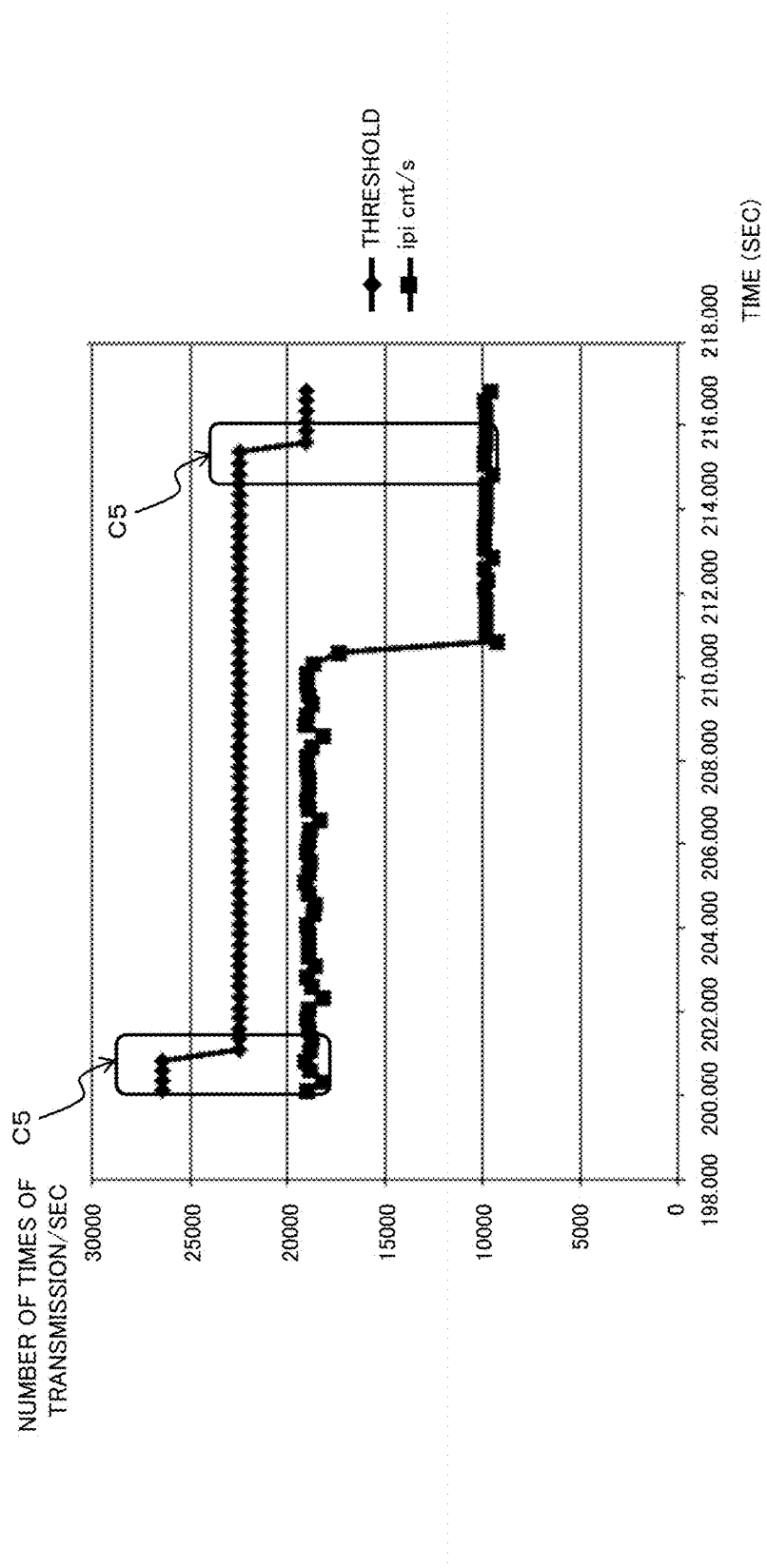

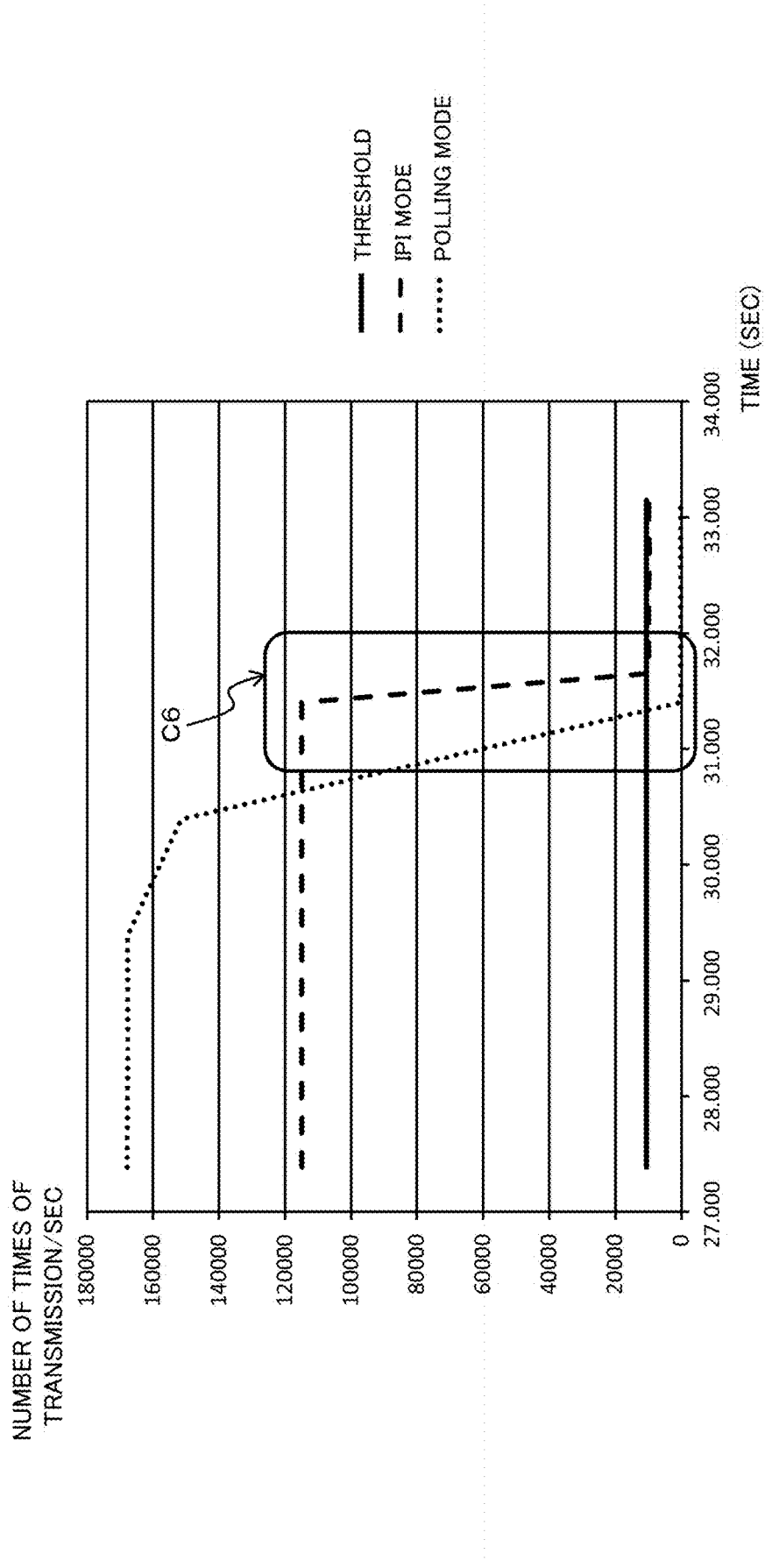

# INFORMATION PROCESSING APPARATUS AND COMPUTER-READABLE RECORDING MEDIUM HAVING PROGRAM RECORDED THEREIN

CROSS-REFERENCE TO RELATED APPLICATION

This application is based upon and claims the benefit of priority of the prior Japanese Patent application No. 2015-016471, filed on Jan. 30, 2015, the entire contents of which are incorporated herein by reference.

FIELD

The embodiment described herein is directed to an information processing apparatus and a computer-readable recording medium having recorded therein a program.

BACKGROUND

In recent years, computer systems allowing a plurality of operating systems (OS) to operate on a single computer architecture have been known.

For example, a plurality of processing modules and a main memory included in a computer system are configured as separate partitions in the computer system and a plurality of OS is executed in parallel in different partitions.

In such a computer system, it is known that different partitions communicate with each other through a shared memory.

Other partitions are notified that data is stored in the shared memory through an interrupt notification.

In a system in which a plurality of virtual OS is executed on a hypervisor as a virtualized OS, for example, an interrupt notification is made to the virtual OS at the transmission destination by using an IPI (Inter-Processor Interrupt) function via the hypervisor. IPI is interrupt control between guest OSs via the hypervisor. The virtual OS at the transmission destination having received the interrupt recognizes reception preparations of transmission data by reading an area in the shared memory. In this manner, a data exchange (communication) between virtual OSs is completed. Hereinafter, the guest OS may be referred to as GOS.

In such a conventional computer system, however, the ratio of the time needed for IPI communication processing is high and the IPI communication processing forms a bottleneck in processing performance of inter-OS communication. Accordingly, a problem of the speed of inter-OS communication being reduced by the IPI communication processing is posed.

This is because processing makes a transition up to the hypervisor layer when IPI is issued in GOS and overheads of software processing in the hypervisor are high and so it takes time before IPI is issued.

[Patent Literature 1] Japanese Laid-open Patent Publication No. 2004-220216

[Patent Literature 2] Japanese National Publication of International Patent Application No. 2008-535099

[Patent Literature 3] International Publication Pamphlet No. 2006/022161

SUMMARY

According to an aspect of the embodiments, to achieve the above object, the information processing apparatus executing a first virtual operating system (OS) and a second virtual OS, the apparatus includes a shared memory accessible from each of the first virtual OS and the second virtual OS, first storage processing unit that stores shared data in a data sharing area of the shared memory in the first virtual OS transmitting the shared data, an update determination unit that periodically checks an update state of the data sharing area in the second virtual OS receiving the shared data, and a first read processing unit that reads the shared data from the data sharing area when the data sharing area is updated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an actual measurement example of the number of times of transmission of the shared data from OS for SAN to OS for NAS in the storage apparatus as an example of an embodiment; and FIG. 17 is a diagram illustrating an actual measurement example of the number of times of transmission of the shared data from OS for SAN to OS for NAS in the storage apparatus as an example of an embodiment.

DESCRIPTION OF EMBODIMENT

Hereinafter, an embodiment of an information processing apparatus and a grogram will be described with reference to the drawings. However, the embodiment shown below is by way of example and there is no intention to exclude various modifications and application of technology that are not explicitly shown in the embodiment. That is, the present embodiment can be carried out by making various modifications without deviating from the spirit thereof. Each diagram is not intended to include only structural elements illustrated in the diagram and may contain other functions and the like.

(A) Configuration

Figure 1:
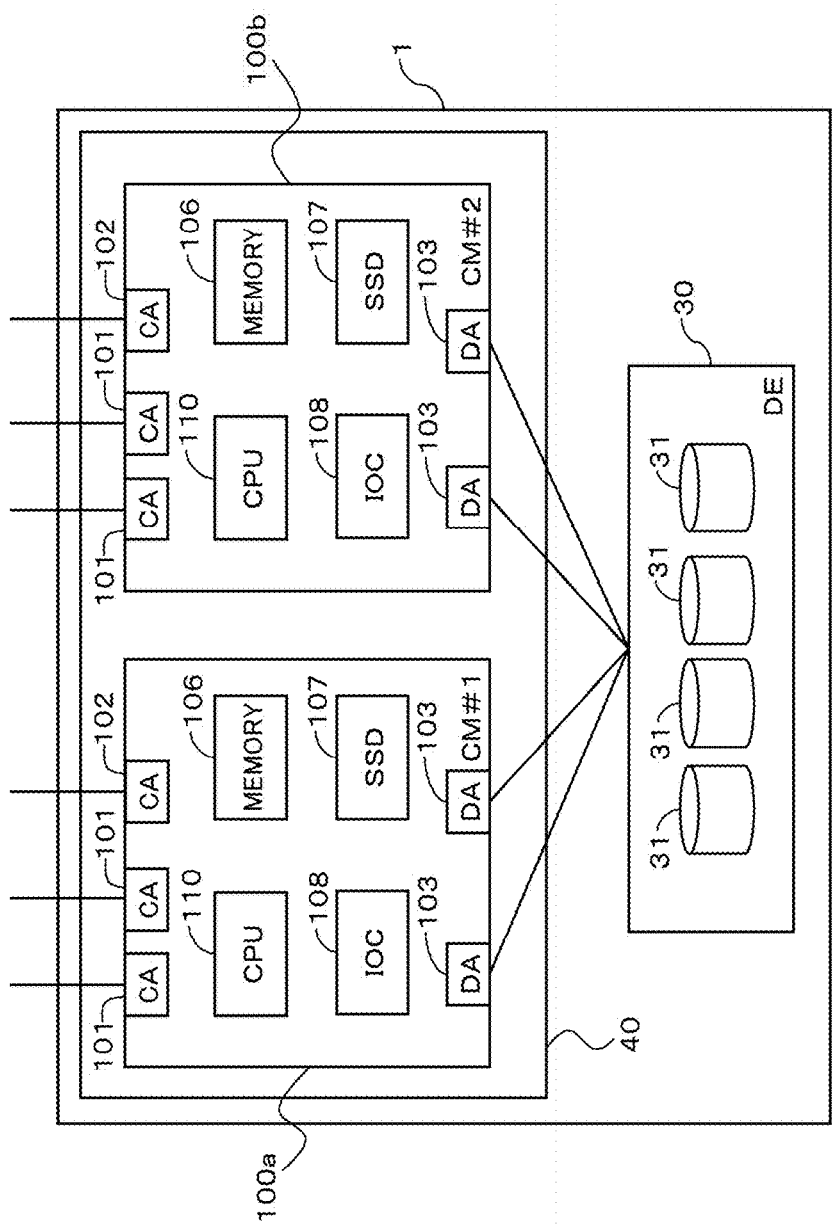
FIG. 1 is a diagram schematically illustrating a hardware configuration of a storage apparatus as an example of an embodiment.

FIG. 1 is a diagram schematically illustrating the hardware configuration of a storage apparatus 1 as an example of an embodiment.

The present storage apparatus 1 forms a virtual storage environment by virtualizing a storage device 31 stored in a drive enclosure (DE) 30. Then, the storage apparatus 1 provides a virtual volume to a host apparatus (not illustrated) as an upper-level apparatus.

The present storage apparatus 1 is communicably connected to one or more host apparatuses. The host apparatus and the storage apparatus 1 are connected by Communication Adapters (CA) 101, 102.

The host apparatus is, for example, an information processing apparatus equipped with a server function and transmits/receives commands of Network Attached Storage (NAS) or Storage Area Network (SAN) to/from the present storage apparatus 1. The host apparatus writes data to or reads data from a volume provided by the storage apparatus 1 by, for example, transmitting a disk access command like read/write in NAS to the storage apparatus 1.

Then, in response to an input/output request (for example, a read command or a write command) made to the volume from the host apparatus, the present storage apparatus 1 performs read or write processing of data on the real storage corresponding to the volume. The input/output request from the host apparatus may also be referred to as an I/O command or an I/O request.

The present storage apparatus 1 includes, as illustrated in FIG. 1, a plurality (two in the present embodiment) of Controller Modules (CM) 100a, 100b and the one or more (one in the example illustrated in FIG. 1) drive enclosures 30.

The drive enclosure 30 can be mounted with the one or more (four in the example illustrated in FIG. 1) storage devices (physical disks) 31 and storage areas (real volumes, real storage) of these storage devices 31 are provided to the present storage apparatus 1.

For example, the drive enclosure 30 includes a plurality of slots (not illustrated) and the capacity of real volumes can be changed at any time by inserting the storage device 31 such as Hard Disk Drive (HDD), Solid State Drive (SSD) or the like into these slots. Alternatively, Redundant Arrays of Inexpensive Disks (RAID) may be configured by using a plurality of the storage devices 31.

The drive enclosure 30 is connected to device adapters (DA) 103, 103 of the CM 100a and the DA 103, 103 of the CM 100b. Then, the drive enclosure 30 can be accessed from either of the CM 100a, 100b to write or read data. That is, the access path to the storage device is made redundant by connecting each of the CM 100a, 100b to the storage device 31 of the drive enclosure 30.

A controller enclosure 40 includes the one or more (two in the example illustrated in FIG. 1) CM 100a, 100b.

The CM 100a, 100b are controllers (storage control apparatuses, information processing apparatuses) that control the operation inside the storage apparatus 1 and exercise various kinds of control such as access control of the drive enclosure 30 to the storage device 31 according to an I/O command transmitted from the host apparatus. The CM 100a, 100b are configured approximately in the same manner. Hereinafter, reference numerals 100a, 100b are used as a reference numeral when it is necessary to identify one CM from a plurality of CM, but reference numeral 100 is used when any CM is referred to. The CM 100a may be represented as CM #1 and the CM 100b may be represented as CM #2.

The same reference numeral in diagrams indicate the same or substantially the same unit and thus, a detailed description of the unit is omitted.

The CM 100a, 100b are made redundant and normally, the CM 100a exercises various kinds of control as a primary unit. However, when the primary CM 100a fails, the CM 100b as a secondary unit takes over the operation of the primary CM 100a.

The CM 100a, 100b are connected to the host apparatus via the CA 101, 102 respectively. Then, these CM 100a, 100b receive a command such as read/write transmitted from the host apparatus and control the storage device 31 via the DA 103 or the like. Also, the CM 100a, 100b are mutually connected via an interface (not illustrated) such as Peripheral Component Interconnect Express (PCIe).

The CM 100 includes, as illustrated in FIG. 1, the CA 101, 102 and a plurality of (two in the example illustrated in FIG. 1) DA 103, 103 and also includes a Central Processing Unit (CPU) 110, a memory 106, SSD 107, and IOC 108.

The CA 101, 102 receive data transmitted from the host apparatus or the like and transmit data output from the CM 100 to the host apparatus or the like. That is, the CA 101, 102 control the input/output (I/O) of data to/from an external apparatus such as the host apparatus.

The CA 101 is a network adapter to communicably connect to the host apparatus via NAS and is, for example, a Local Area Network (LAN) interface.

The CM 100 is connected to the host apparatus or the like by the CA 101 via a communication network (not illustrated) through NAS to receive the I/O command or transmit/receive data. In the example illustrated in FIG. 1, the two CAs 101, 101 are provided to each of the CM 100a, 100b.

The CA 102 is a network adapter to communicably connect to the host apparatus via SAN and is, for example, an Internet Small Computer System Interface (iSCSI) or an Fibre Channel (FC) interface.

The CM 100 is connected to the host apparatus or the like by the CA 102 via a communication network (not illustrated) through SAN to receive the I/O command or transmit/receive data. In the example illustrated in FIG. 1, the one CA 102 is provided to each of the CM 100a, 100b.

The DA 103 is an interface to communicably connect to the drive enclosure 30, the storage device 31 or the like. The storage devices 31 of the drive enclosure 30 are connected to the DA 103 and the CM 100 exercises access control to these storage devices 31 based on an I/O command received from the host apparatus.

The CM 100 writes data to or reads data from the storage device 31 via the DA 103. In the example illustrated in FIG. 1, each of the CM 100a, 100b includes the two DA 103, 103. Then, in each of the CM 100a, 100b, the drive enclosure 30 is connected to each of the DA 103.

Accordingly, data can be written to or read from the storage device 31 of the drive enclosure 30 from each of the CM 100a, 100b.

The SSD 107 is a storage device that stores programs executed by the CPU 110 and various kinds of data.

The memory 106 is a storage device that temporarily stores various kinds of data and programs and includes a memory area and a cache area (not illustrated). The cache area temporarily stores data received from the host apparatus or data to be transmitted to the host apparatus. The memory area is used by temporarily storing/expanding data or programs when the CPU 110 executes programs.

The Input Output Controller (IOC) 108 is a control apparatus that controls data transfer inside the CM 100 and realizes, for example, Direct Memory Access (DMA) transfer that transfers data stored in the memory 106 without going through the CPU 110.

The CPU 110 is a processing apparatus that performs various kinds of control and operations and is a multiprocessor (multi-CPU). The CPU 110 realizes various functions by executing OS and programs stored in the SSD 107 and the like.

The CPU 110 can allow to execute a plurality of OS (virtual OS) by executing a hypervisor 200 as a virtualized OS and executing a plurality of virtual machines (VM) on the hypervisor. Hereinafter, OS operating on the hypervisor 200 may be referred to as the guest OS or GOS.

A plurality of guest OS can share hardware resources such as the CPU 110, the memory 106, and the SSD 107.

Incidentally, a plurality of the CPU 110 may be included to execute the hypervisor 200 on the plurality of CPU 110.

Figure 2:
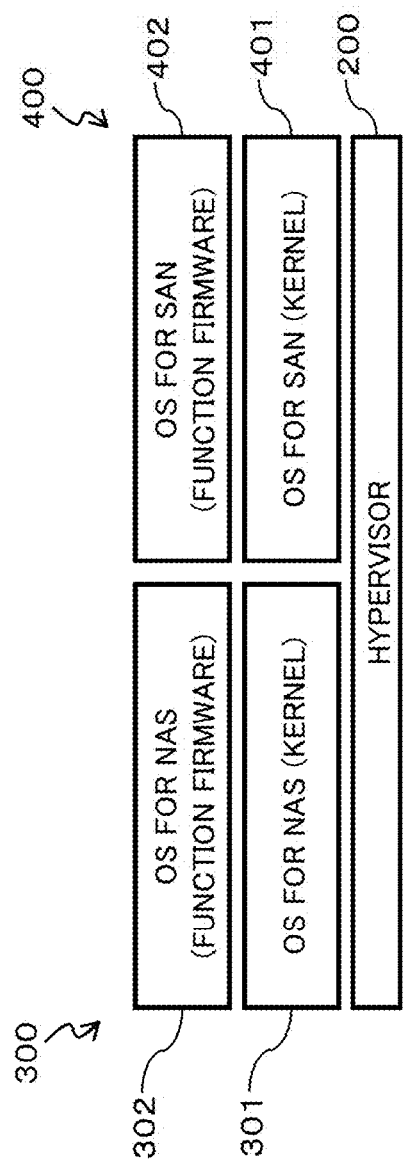
FIG. 2 is a diagram schematically illustrating a plurality of OS on a hypervisor in the storage apparatus as an example of an embodiment.

FIG. 2 is a diagram schematically illustrating a plurality of OS on the hypervisor 200 in the storage apparatus 1 as an example of an embodiment.

In the present embodiment, as illustrated in FIG. 2, OS for SAN 400 and OS for NAS 300 are executed on the hypervisor 200.

The OS for SAN 400 is OS (second virtual OS) for exercising SAN control and includes a kernel 401 and function firmware 402. Various known OS can be used as the OS for SAN 400 and in the present embodiment, an example using VxWorks (registered trademark) by Wind River will be shown.

The OS for NAS 300 is OS (first virtual OS) for exercising NAS control and includes a kernel 301 and function firmware 302. Various known OS can be used as the OS for NAS 300 and in the present embodiment, an example using Linux (registered trademark) be shown.

The hypervisor 200, the OS for SAN 400, and the OS for NAS 300 function as described above by a storage control program being executed by the CPU 110.

The program (storage control program) to realize these functions as the hypervisor 200, the OS for SAN 400, and the OS for NAS 300 is provided in a form of being recorded in a computer-readable recording medium, for example, a flexible disk, CD (CD-ROM, CD-R, CD-RW and the like), DVD (DVD-ROM, DVD-RAM, DVD-R, DVD+R, DVD-RW, DVD+RW, HD DVD and the like), blu-ray disc, magnetic disc, optical disc, magneto-optical disc and the like. Then, the computer reads the program from the recording medium and transfers and stores the program in an internal storage device or an external storage device for use. Alternatively, the program may be recorded in a storage device (recording medium) so as to be provided to the computer from the storage device via a communication path.

When the functions of the hypervisor 200, the OS for SAN 400, the OS for NAS 300 are realized, the program stored in the internal storage device (in the present embodiment, the memory 106 or the SSD 107) is executed by the microprocessor (in the present embodiment, the CPU 110) of the computer. At this point, the program recorded in the recording medium may be read and executed by the computer.

Figure 3:
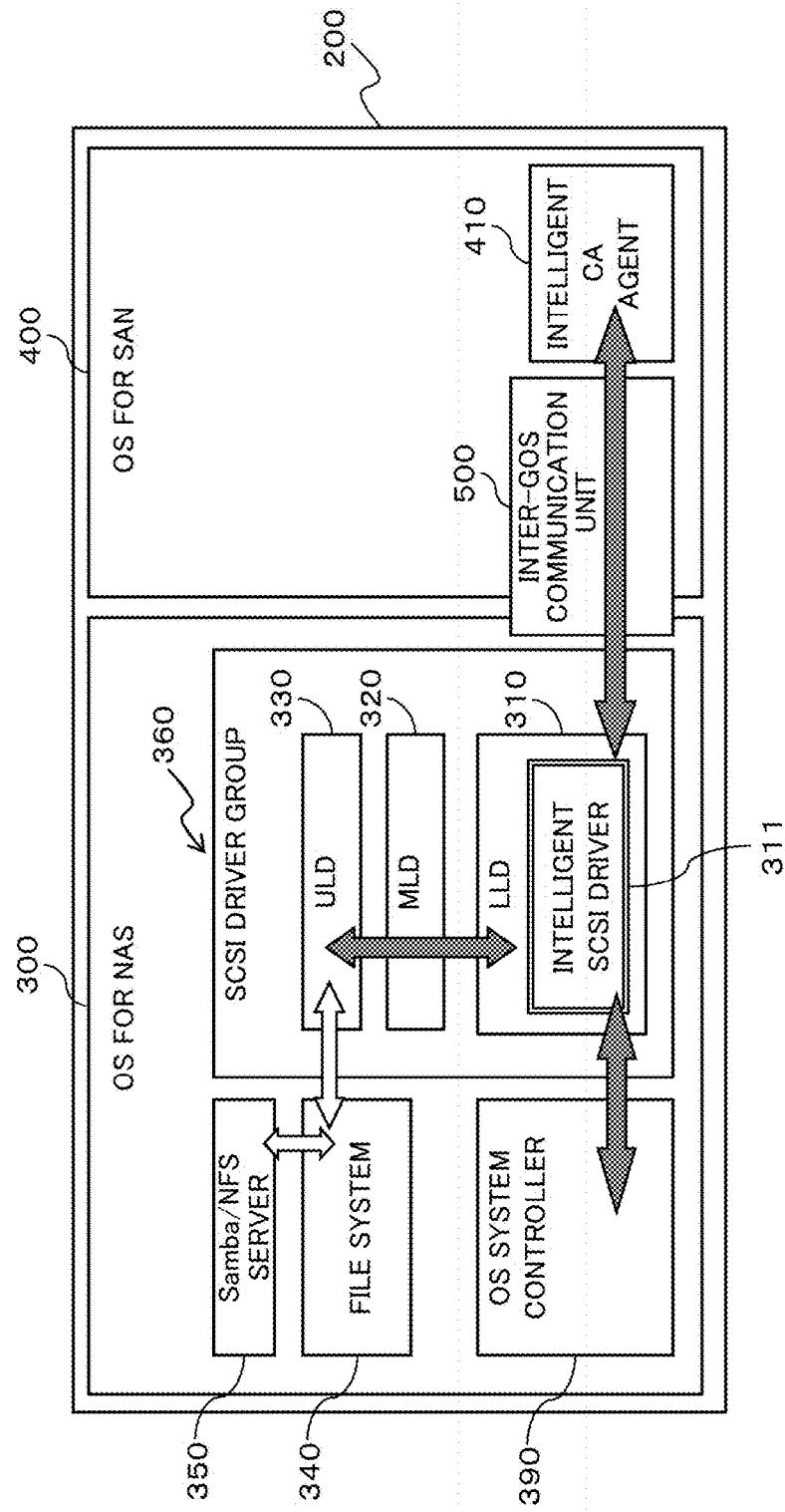
FIG. 3 is a diagram schematically illustrating a function configuration of OS for NAS and OS for SAN on the hypervisor in the storage apparatus as an example of an embodiment.

FIG. 3 is a diagram schematically illustrating a function configuration of the OS for NAS 300 and the OS for SAN 400 on the hypervisor 200 in the storage apparatus 1 as an example of an embodiment.

The OS for NAS 300 includes, as illustrated in FIG. 3, Samba/Network File System (NFS) server software 350, a file system 340, an OS system controller 390, and an SCSI driver group 360.

On the other hand, the OS for SAN 400 includes an intelligent CA agent 410. Also, an inter-GOS communication unit 500 linking the OS for NAS 300 and the OS for SAN 400 is included.

The Samba/NFS server software 350 is a file system based application and receives an I/O request of NAS received from the host apparatus through Samba or NFS and delivers the I/O request to the file system 340.

The file system 340 is a file system of, for example, Virtual file system (VFS) or ext3 and converts the I/O request received from the Samba/NFS server software 350 into API for each related local file system and delivers the API to the SCSI driver group 360.

The OS system controller 390 is used to exercise various kinds of control common as OS for NAS and issues an event request, for example, an addition request of device to the SCSI driver group 360 (LLD 310).

The SCSI driver group 360 includes a plurality of drivers to control SCSI devices.

The SCSI driver group 360 has, as illustrated in FIG. 3, a hierarchical structure including three layers of Upper Level Driver (ULD) 330, Middle Level Driver (MLD) 320, and Lower Level Driver (LLD) 310.

The ULD 330 includes the SCSI kernel and top-level interfaces of main device type drivers.

Four drivers of SD, SR, ST, and SG are provided for the ULD 330 and these drivers are used depending on the type of SCSI devices. SD is used for accessing HDD and is a block type. SR is used for accessing CD-ROM and is a block type. ST is used for accessing a tape device and is a block type. SG is a pseudo-host adapter used when a host bus adapter (hardware) is not interposed and is a character type.

The MLD 320 provides SCSI driver Application Programming Interface (API; library) toward the ULD 330 and LLD 310. SCSI drivers read the MLD 320 to exercise control.

Figure 4:
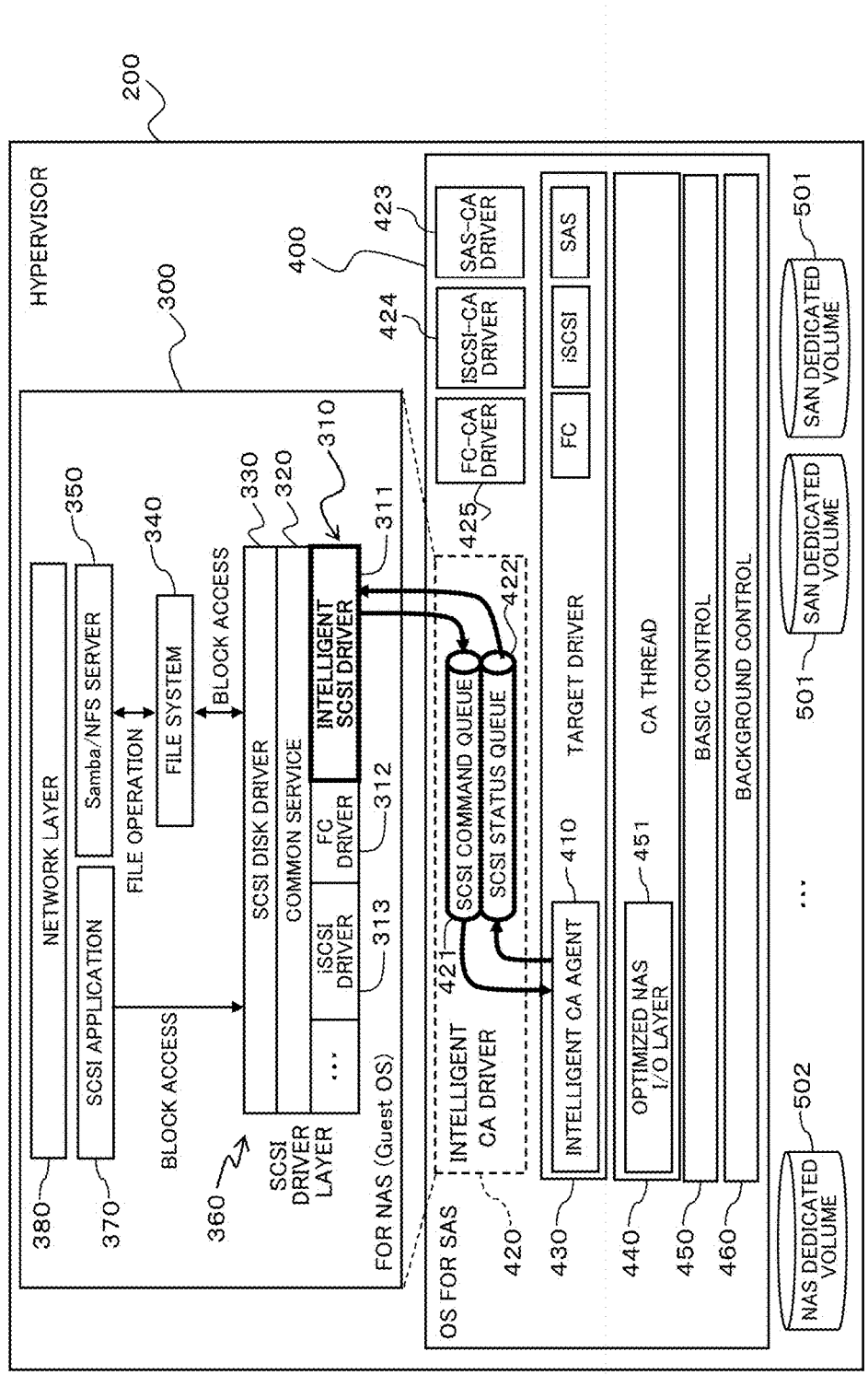
FIG. 4 is a diagram illustrating a detailed function configuration of OS for NAS and OS for SAN on the hypervisor in the storage apparatus as an example of an embodiment.

The LLD 310 includes actual drivers compliant with physical interfaces applicable to SCSI and corresponds to a host bus adapter. The LLD 310 is a driver layer that controls hardware interfaces and the driver to be used is specific to the device. For example, the LLD 310 includes, as illustrated in FIG. 4, an iSCSI driver 313 and an FC driver 312. Further, in the present storage apparatus 1, an intelligent SCSI driver 311 is included in the LLD 310. Incidentally, an existing Linux driver can be used for the ULD 330 and the MLD 320.

In the OS for NAS 300, an I/O request from the host apparatus reaches, as illustrated in FIG. 3, the intelligent SCSI driver 311 of the LLD 310 via the Samba/NFS server software 350, the file system 340, the ULD 330, and the MLD 320.

The intelligent SCSI driver 311 receives an I/O request from the file system 340 and transmits the I/O request to the intelligent CA agent 410 on the OS for SAN 400 side via the inter-GOS communication unit 500 described below. Incidentally, the I/O request is received by the intelligent SCSI driver 311 in an SCSI command format.

The intelligent SCSI driver 311 also receives a response (result) to the transmitted SCSI command from the intelligent CA agent 410 and notifies the ULD 330 of the SCSI driver group 360 of the received result.

When an I/O request of NAS is received from the host apparatus or the like, the intelligent SCSI driver 311 inhibits direct access to a SAN dedicated volume 501 (see FIG. 4) and transmits the I/O request of NAS to the OS for SAN 400 by inter-GOS communication via the inter-GOS communication unit 500 described below.

Further, the intelligent SCSI driver 311 processes an event request related to a device received from the OS system controller 390 of the OS for NAS 300. If, for example, the event request is an addition request of device, the intelligent SCSI driver 311 receives the addition request and adds (defines) a device file to the "/dev" directory.

FIG. 4 is a diagram illustrating a detailed function configuration of the OS for NAS 300 and the OS for SAN 400 on the hypervisor 200 in the storage apparatus 1 as an example of an embodiment.

The OS for NAS 300 includes, as illustrated in FIG. 4, the SCSI driver group 360, the file system 340, the Samba/NFS server software 350, an SCSI application 370, and a network layer 380.

The network layer 380 exercises communication control in a network layer and receives, for example, an I/O request of NAS from the host apparatus.

The SCSI driver group 360 is a driver group to control SCSI devices and corresponds to the SCSI driver group 360 illustrated in FIG. 3.

In the OS for NAS 300, an I/O control request is made to the SCSI driver group 360 via the file system 340.

In the SCSI driver group 360, an SCSI disk driver corresponds to the ULD 330 illustrated in FIG. 3 and a common service corresponds to the MLD 320.

Also in the SCSI driver group 360, the iSCSI driver 313 and the FC driver 312 corresponding to the aforementioned LLD 310 are included. The function of each unit as the OS for NAS 300 is known in, for example, Linux and a detailed description thereof is omitted.

Then, in the present storage apparatus 1, the aforementioned intelligent SCSI driver 311 is included in the LLD 310 of the SCSI driver group 360.

The OS for SAN 400 includes, as illustrated in FIG. 4, an intelligent CA driver 420, a target driver 430, a CA thread 440, a basic control 450, a background control 460, an FC-CA driver 425, an iSCSI-CA driver 424, and an SAS-CA driver 423.

The functions of, among these, the target driver 430, the CA thread 440, the basic control 450, the background control 460, the FC-CA driver 425, the iSCSI-CA driver 424, and the SAS-CA driver 423 are known in the OS for SAN 400 of VxWorks or the like and the description thereof is omitted.

The intelligent CA driver 420 is a virtual driver layer of NAS added to a channel adapter driver layer of SAN control in the OS for SAN 400. The intelligent CA driver 420 exchanges I/O requests of NAS and responses with the OS for NAS 300. The intelligent CA driver 420 includes an SCSI command queue 421 and an SCSI status queue 422.

For example, I/O commands received from the OS for NAS 300 are stored in the SCSI command queue 421 and status information responding to the OS for NAS 300 or the like is stored in the SCSI status queue 422.

The target driver 430 includes the intelligent CA agent 410. The intelligent CA agent 410 is a NAS dedicated function added to the target driver 430 and is a block that controls I/O requests from the OS for NAS 300 received via inter-GOS communication.

The CA thread 440 includes an optimized NAS I/O layer 451. The optimized NAS I/O layer 451 processes an I/O request from the OS for NAS 300 and is obtained by customizing a CA thread (including a CA driver) of SAN.

Further, the one SAN dedicated volume 501 or more and a NAS dedicated volume 502 are provided on the hypervisor 200. The SAN dedicated volume 501 is a storage area where an I/O request in SAN is made and the NAS dedicated volume 502 is a storage area where an I/O request in NAS is made. That is, the SAN dedicated volume 501 and the NAS dedicated volume 502 are guest OS dedicated volumes.

The SAN dedicated volume 501 and the NAS dedicated volume 502 are set/managed by, for example, a management apparatus (not illustrated).

The inter-GOS communication unit 500 exchanges data between guest OSs and in the present storage apparatus 1, exchanges data between the OS for NAS (first virtual OS) 300 and the OS for SAN (second virtual OS) 400. More specifically, for example, the inter-GOS communication unit 500 delivers an I/O request (SCSI command) received by the OS for NAS 300 from the intelligent SCSI driver 311 to the intelligent CA agent 410 on the side of the OS for SAN 400.

Also, the inter-GOS communication unit 500 delivers a response (result) to the I/O request from the intelligent CA agent 410 of the OS for SAN 400 to the intelligent SCSI driver 311 of the OS for NAS 300.

Figure 5:
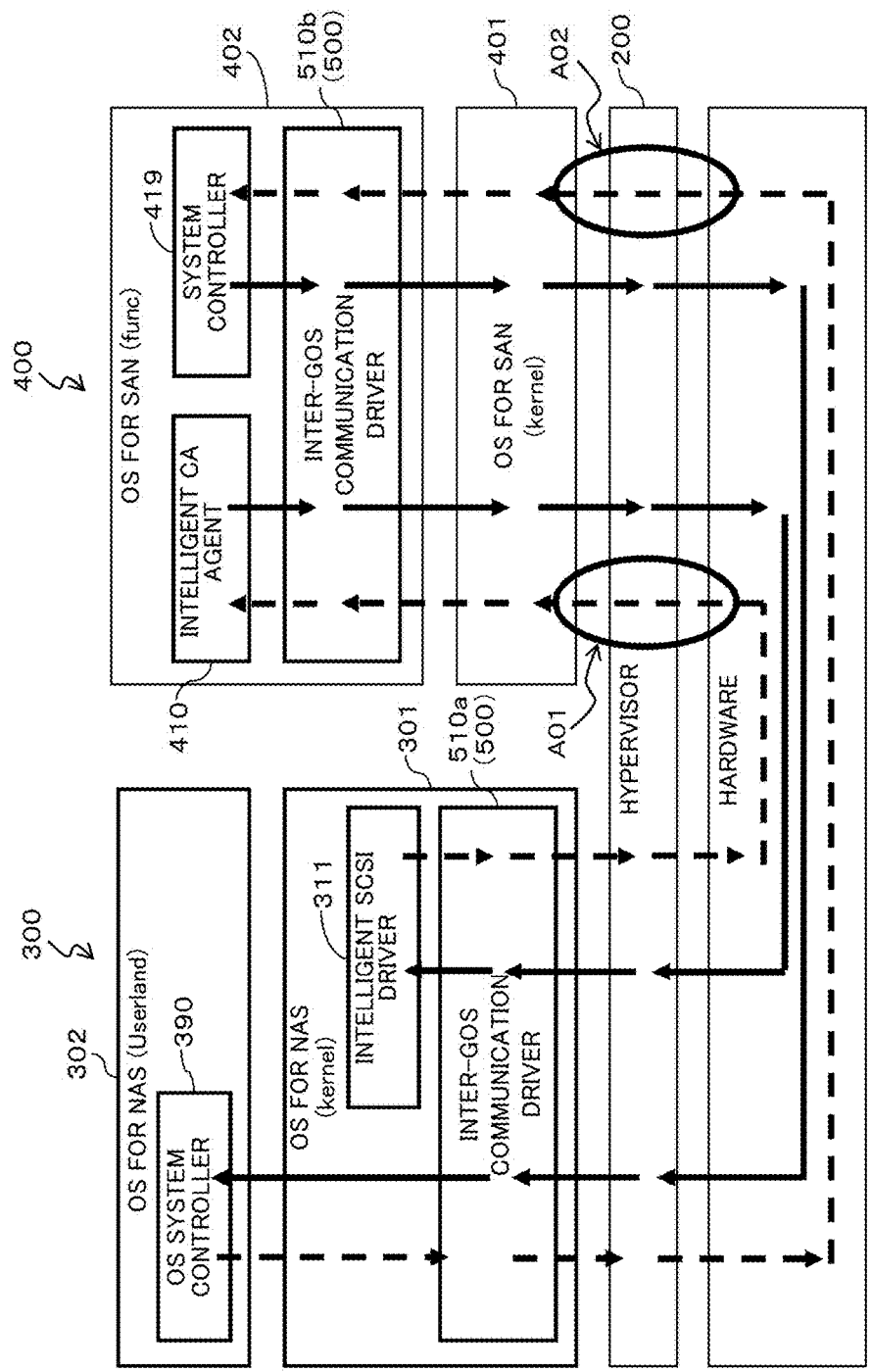
FIG. 5 is a diagram illustrating inter-GOS communication in the storage apparatus as an example of an embodiment.
Figure 6:
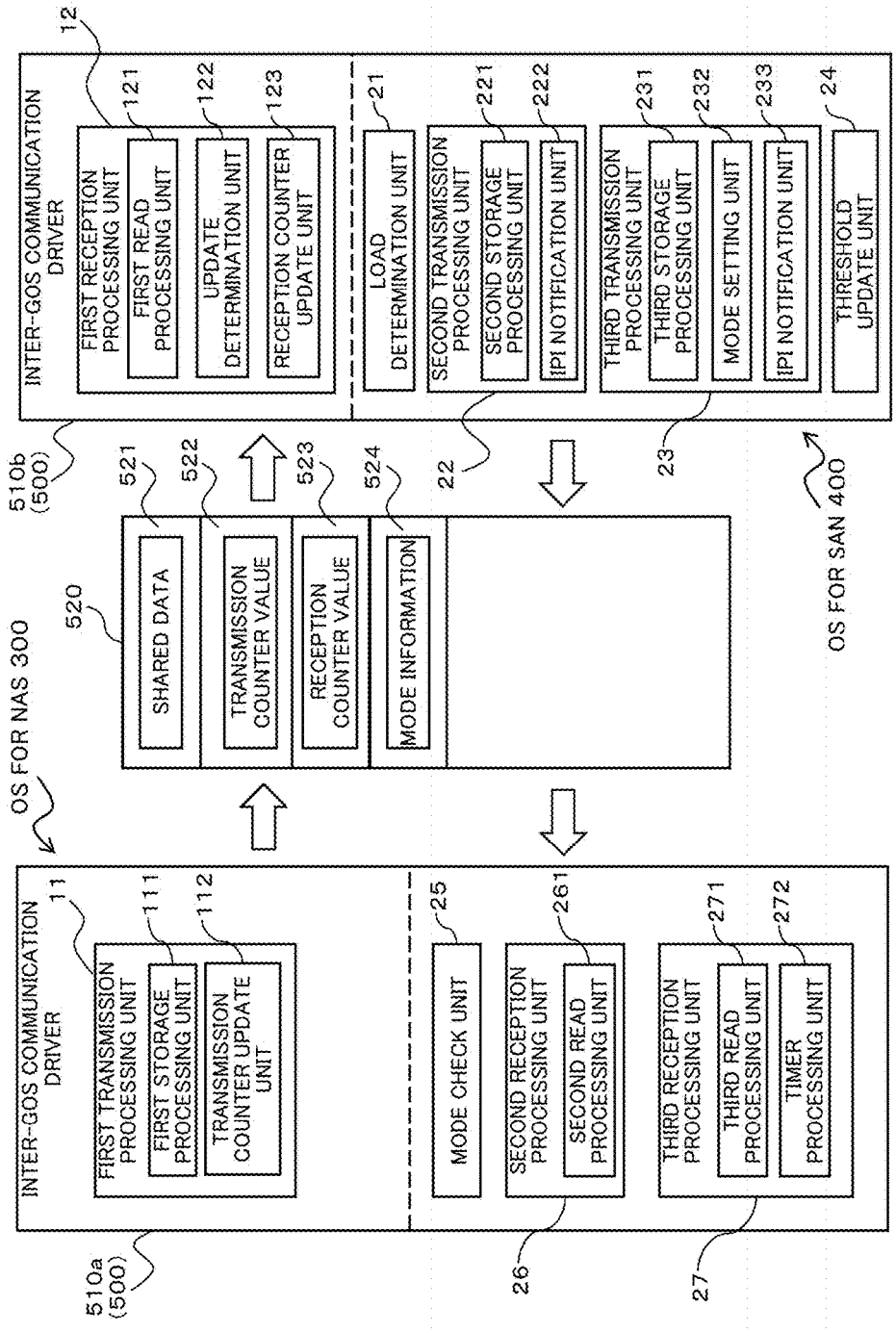
FIG. 6 is a diagram illustrating the function configuration of an inter-GOS communication unit in the storage apparatus as an example of an embodiment.

FIG. 5 is a diagram illustrating inter-GOS communication in the storage apparatus 1 as an example of an embodiment and FIG. 6 is a diagram illustrating the function configuration of the inter-GOS communication unit 500.

The inter-GOS communication unit 500 controls communication between guest OSs by providing an inter-GOS communication driver 510 in each of the OS for SAN 400 and the OS for NAS 300. Hereinafter, the inter-GOS communication driver provided in the OS for SAN 400 will be represented by using reference numeral 510b and the inter-GOS communication driver provided in the OS for NAS 300 will be represented by using reference numeral 510a.

As illustrated in FIG. 6, the inter-GOS communication driver 510a includes functions as a first transmission processing unit 11, a mode check unit 25, a second reception processing unit 26, and a third reception processing unit 27.

The functions as the mode check unit 25, the second reception processing unit 26, and the third reception processing unit 27 are implemented as reception processing tasks at an application level on the OS for NAS 300.

The inter-GOS communication driver 510b includes functions as a first reception processing unit 12, a load determination unit 21, a second transmission processing unit 22, a third transmission processing unit 23, and a threshold update unit 24.

The functions as the first reception processing unit 12, the load determination unit 21, the second transmission processing unit 22, the third transmission processing unit 23, and the threshold update unit 24 are also implemented at an application level on the OS for SAN 400.

A shared memory 520 shared by the OS for NAS 300 and the OS for SAN 400 is used for inter-GOS communication.

The shared memory 520 is a storage device from which data can be read and to which data can be written from both of the OS for NAS 300 and the OS for SAN 400. The shared memory 520 includes a data sharing area 521, a transmission counter value storage area 522, a reception counter value storage area 523, and a mode information storage area 524.

Data (shared data) delivered (transmitted) from one GOS to the other GOS is stored in the data sharing area 521. That is, data transmitted from the OS for SAN 400 to the OS for NAS 300 and data transmitted from the OS for NAS 300 to the OS for SAN 400 are stored therein.

In the data sharing area 521, it is desirable to provide a storage location of data transmitted from the OS for SAN 400 to the OS for NAS 300 and a storage location of data transmitted from the OS for NAS 300 to the OS for SAN 400 separately.

In the transmission counter value storage area 522, a transmission counter value (first counter value) is stored. The transmission counter value is updated by a transmission counter update unit 112 described below and read by an update determination unit 122 described below.

In the reception counter value storage area 523, a reception counter value is stored. The reception counter value is updated by a reception counter update unit 123 described below and read by the update determination unit 122 described below.

In the mode information storage area 524, mode information indicating the mode of data transmission from the OS for SAN 400 to the OS for NAS 300 is stored. The mode information is set by the load determination unit 21 and details thereof will be described below.

As the shared memory 520, for example, a portion of the storage device of the memory 106 provided in the primary CM 100a may be used or a memory may be included separately from the memory 106. Alternatively, the shared memory 520 may be provided outside the primary CM 100a.

The first transmission processing unit 11 and the first reception processing unit 12 are used for data communication from the OS for NAS 300 to the OS for SAN 400.

The first transmission processing unit 11 includes, as illustrated in FIG. 6, a first storage processing unit 111 and the transmission counter update unit 112.

The first reception processing unit 12 includes a first read processing unit 121, the update determination unit 122, and the reception counter update unit 123.

The first storage processing unit 111 stores data (shared data) to be transmitted to the OS for SAN 400 in the data sharing area 521 of the shared memory 520 in the OS for NAS 300 as a transmission source of shared data.

The transmission counter update unit 112 increments the transmission counter value stored in the transmission counter value storage area 522 when the first storage processing unit 111 stores shared data in the data sharing area 521 in the OS for NAS 300 as a transmission source of the shared data. That is, the transmission counter update unit 112 functions as a first counter value update unit that increments the transmission counter value (first counter value) stored in the shared memory 520.

The first read processing unit 121 reads data (shared data) transmitted from the OS for NAS 300 from the data sharing area 521 of the shared memory 520 in the OS for SAN 400 as a transmission destination of shared data. The shared data read from the data sharing area 521 is moved to, for example, an area for the OS for SAN 400 provided in the shared memory 520 before being used by the OS for SAN 400.

The reception counter update unit 123 increments the reception counter value stored in the reception counter value storage area 523 when the first read processing unit 121 reads shared data from the data sharing area 521 of the shared memory 520 in the OS for SAN 400 as a transmission destination of the shared data. That is, the reception counter update unit 123 functions as a second counter value update unit that increments the reception counter value (second counter value) stored in the shared memory 520.

The update determination unit 122 periodically checks an update state of the data sharing area 521 of the shared memory 520 by polling in the OS for SAN 400 as a transmission destination.

The update determination unit 122 compares the transmission counter value stored in the transmission counter value storage area 522 and the reception counter value stored in the reception counter value storage area 523. If the transmission counter value and the reception counter value mismatch, the update determination unit 122 determines that the data sharing area 521 of the shared memory 520 has been updated, that is, new shared data transmitted from the OS for NAS 300 has been stored in the data sharing area 521.

Then, the update determination unit 122 periodically checks whether such shared data is stored in the data sharing area 521 by polling.

Figure 7:
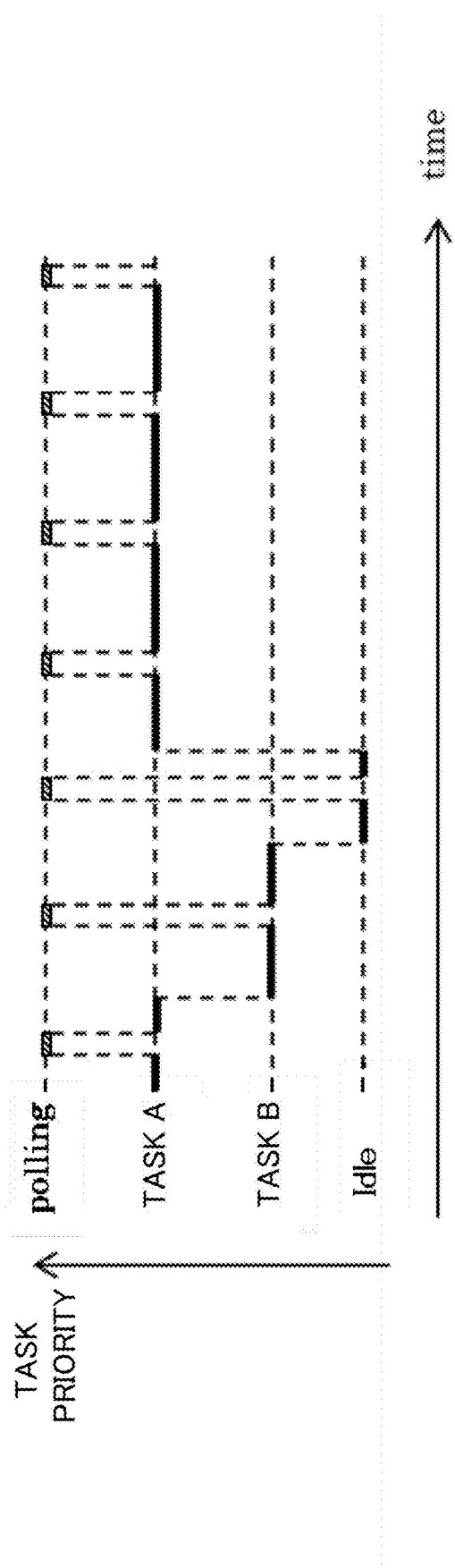
FIG. 7 is a diagram exemplifying first update determination timing of an update determination unit in the storage apparatus as an example of an embodiment.

FIG. 7 is a diagram exemplifying first update determination timing of the update determination unit 122 in the storage apparatus 1 as an example of an embodiment.

A periodic interrupt (timer interrupt) is input into the update determination unit 122 from a timer (not illustrated) and as the first update determination timing, the update state of the data sharing area 521 is polled in the timing of a timer interrupt being input.

As illustrated in FIG. 7, polling (checking) of the update state of the data sharing area 521 is performed when some process (in the example illustrated in FIG. 7, tasks A and B) is performed by the CPU 110 or a time interrupt is input even while idle.

The update determination unit 122 also performs polling of the update state of the data sharing area 521 when the process to be performed is switched (during task switching or thread switching) or in a non-execution state of process (while idle).

Incidentally, the functions of the update determination unit 122 and the reception counter update unit 123 are implemented as a scheduler at an application level on the OS for SAN 400.

When the update state of the data sharing area 521 is polled in the timing of a timer interrupt as described above, it takes time before the detection after an interrupt cause occurs if the period of the timer interrupt is prolonged. On the other hand, if the period of the timer interrupt is shortened, the load of the CPU 110 increases, which could hinder other processes.

Thus, in the present storage apparatus 1, the update determination unit 122 polls the update state of the data sharing area 521, in addition to the above timer interrupt, in an interval between tasks, in an interval between threads, and in timing while idle.

Here, the interval between tasks is timing when the task is switched and the interval between threads is timing when the thread is switched. While idle means a state in which the CPU 110 and OS in operation are in an idle state and do not perform any process (non-execution state of process).

Figure 8:
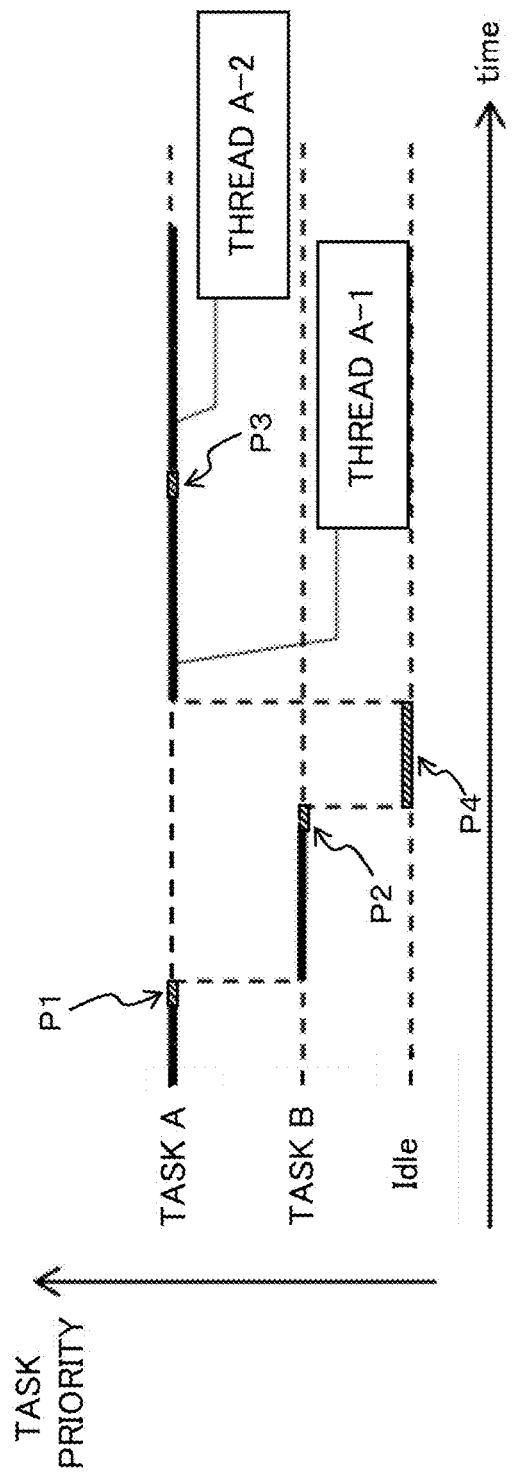
FIG. 8 is a diagram exemplifying second update determination timing of the update determination unit in the storage apparatus as an example of an embodiment.

FIG. 8 is a diagram exemplifying second update determination timing of the update determination unit 122 in the storage apparatus 1 as an example of an embodiment.

In the example illustrated in FIG. 8, polling is performed in timings (second update determination timings) indicated by symbols P1 to P4. More specifically, polling is performed in the timing (see symbol P1) when task A is switched to task B and in the timing (see symbol P2) when task B changes to an idle state. Polling is also performed in the timing (see symbol P3) when thread A-1 is switched to thread A-2 in task A. Further, polling is performed in an idle state (see symbol P4).

In the so-called real-time OS designed by attaching importance to immediate responsiveness like VxWorks in general, limits of the response time and the like are strictly designed and excellent immediate responsiveness is exhibited. Therefore, in the above second update timings, polling can reliably be performed.

In the storage apparatus 1, for example, task or thread switching occurs in each I/O command executed based on an I/O request from the host apparatus and thus, a task interval or a thread interval occurs frequently. Therefore, the update state of the data sharing area 521 can efficiently be polled by polling being performed by the first reception processing unit 12 in the above second update determination timings.

In the present storage apparatus 1, the first reception processing unit 12 polls the update state of the data sharing area 521 in the timing (first update determination timing) of a timer interrupt being input and also polls the update state of the data sharing area 521 in the second update determination timing. Accordingly, data communication can be performed efficiently from the OS for NAS to the OS for SAN without making any interrupt notification by IPI.

Then, when the update determination unit 122 determines that the data sharing area 521 of the shared memory 520 has been updated, the aforementioned first read processing unit 121 reads shared data of the data sharing area 521 from the data sharing area 521 of the shared memory 520.

That is, when the shared memory 520 has been updated, the first read processing unit 121 (first reception processing unit 12) reads shared data from the data sharing area 521 of the shared memory 520.

Thus, in the data communication from the OS for NAS 300 to the OS for SAN 400, data is read by the first reception processing unit 12 from the data sharing area 521 of the shared memory 520 based on polling.

In the data communication from the OS for SAN 400 to the OS for NAS 300, on the other hand, the load determination unit 21, the second transmission processing unit 22, the third transmission processing unit 23, the threshold update unit 24, the mode check unit 25, the second reception processing unit 26, and the third reception processing unit 27 are used.

The load determination unit 21 determines the load state of the OS for SAN 400. More specifically, the load determination unit 21 calculates a load state value indicating the load state of the OS for SAN 400. For example, the load determination unit 21 calculates the number of times of transmission per second (number of times of transmission/ sec) of shared data from the OS for SAN 400 to the OS for NAS 300 as the load state value.

Then, the load determination unit 21 compares the calculated load state value with a threshold T to determine whether the load state value is equal to or more than the threshold T. That is, the load determination unit 21 functions as a load determination unit that determines whether load state value representing the load state in the OS for SAN 400 is equal to or more than the threshold T. A state in which the load state value is equal to or more than the threshold T indicates a high-load state of the OS for SAN 400 and a state in which the load state value is less than the threshold T indicates a low-load state of the OS for SAN 400.

In the present storage apparatus 1, when the OS for SAN 400 is in a low-load state, data communication from the OS for SAN 400 to the OS for NAS 300 is performed in IPI mode. When the OS for SAN 400 is in a high-load state, data communication from the OS for SAN 400 to the OS for NAS 300 is performed in polling mode.

In IPI mode, the second transmission processing unit 22 of the OS for SAN 400 transmits shared data and the second reception processing unit 26 of the OS for NAS 300 receives the shared data.

In polling mode, the third transmission processing unit 23 of the OS for SAN 400 transmits shared data and the third reception processing unit 27 of the OS for NAS 300 receives the shared data.

The second transmission processing unit 22 includes, as illustrated in FIG. 6, a second storage processing unit 221 and an IPI notification unit 222.

The second storage processing unit 221 stores data (shared data) to be transmitted to the OS for NAS 300 in the data sharing area 521 of the of the shared memory 520 in the OS for SAN 400 as a transmission source of the shared data.

The IPI notification unit 222 notifies the inter-GOS communication driver 510a of the OS for NAS 300 at the transmission destination of an interrupt by using the IPI function via the hypervisor 200. That is, the IPI notification unit 222 functions as a notification unit that notifies the OS for NAS 300 that the second storage processing unit 221 has stored shared data in the data sharing area 521 of the shared memory 520 through an interrupt signal. Hereinafter, an interrupt notification by the IPI function may be referred to as an IPI notification.

The second reception processing unit 26 includes, as illustrated in FIG. 6, a second read processing unit 261 and reads shared data stored in the data sharing area 521 of the shared memory 520 in the timing of an IPI notification being received.

More specifically, when an IPI notification is input from the IPI notification unit 222, an interrupt handler in the OS for NAS 300 activates a reception processing task and the function as the second reception processing unit 26 (second read processing unit 261) is started.

When an IPI notification from the IPI notification unit 222 is input, the second read processing unit 261 reads data stored in the data sharing area 521 of the shared memory 520. The shared data read from the data sharing area 521 is used by, for example, the OS for NAS 300 after being moved to an area for the OS for NAS 300 provided in the shared memory 520.

The third transmission processing unit 23 includes, as illustrated in FIG. 6, a third storage processing unit 231, a mode setting unit 232, and an IPI notification unit 233.

The third storage processing unit 231 stores data (shared data) to be transmitted to the OS for NAS 300 in the data sharing area 521 of the shared memory 520 in the OS for SAN 400 as a transmission source of the shared data.

The mode setting unit 232 sets an operation mode to the mode information storage area 524 of the shared memory 520.

If, as a result of determination by the load determination unit 21 described above, the load state value is equal to or more than the threshold T, that is, the OS for SAN 400 is in a high-load state, the mode setting unit 232 sets a value indicating the polling mode (first mode) to the mode information storage area 524 of the shared memory 520 as operation mode information.

Then, if the high-load state of the OS for SAN 400 continues, the mode setting unit 232 does not change the operation mode information of the mode information storage area 524 of the shared memory 520 (inhibits any change thereof).

If the load state value is less than the threshold T, that is, the OS for SAN 400 is in a low-load state, the mode setting unit 232 sets a value indicating the IPI mode (second mode) to the mode information storage area 524 of the shared memory 520 as operation mode information.

The IPI notification unit 233 notifies the inter-GOS communication driver 510a of the OS for NAS 300 at the transmission destination of an interrupt by using the IPI function via the hypervisor 200. That is, the IPI notification unit 233 functions as a notification unit that notifies the OS for NAS 300 that the third storage processing unit 231 has stored shared data in the data sharing area 521 of the shared memory 520 through an interrupt signal (IPI notification).

Then, while the high-load state of the OS for SAN 400 continues, the IPI notification unit 233 inhibits issuance of the IPI notification to the OS for NAS 300.

The threshold update unit 24 sets an appropriate threshold by updating the value of the threshold T. If the operation mode is changed by the mode setting unit 232 during data communication from the OS for SAN 400 to the OS for NAS 300, the threshold update unit 24 determines an effect due to the change of the operation mode.

More specifically, the threshold update unit 24 compares the load state value of the OS for SAN 400 before the operation mode is changed and the load state value of the OS for SAN 400 after the operation mode is changed and if the load state value before the change is larger than the load state value after the change, determines that no effect due to the change of the operation mode is obtained.

Here, for example, the number of times of transmission of shared data per reference time is used as the load state. In the present embodiment, an example in which 16.6 msec (1/60 sec) is used as the reference time is shown. However, the reference time is not limited to such an example and may appropriately be changed and used.

The threshold update unit 24 determines that no effect due to the change of the operation mode is obtained if the load state value before the change is larger than the load state value after the change. Then, the threshold update unit 24 increases the value of the threshold T by a predetermined value.

By increasing the threshold T in this manner, subsequently processes can be made more efficient by inhibiting the change of the operation mode under similar loads. That is, the threshold update unit 24 optimizes the threshold T.

The third reception processing unit 27 includes, as illustrated in FIG. 6, a third read processing unit 271 and a timer processing unit 272 and reads shared data stored in the data sharing area 521 of the shared memory 520 by polling.

The function as the third reception processing unit 27 is started in the timing of an IPI notification from the IPI notification unit 233.

More specifically, when an IPI notification is input from the IPI notification unit 233, an interrupt handler in the OS for NAS 300 activates a reception processing task and the function as the third reception processing unit 27 (third read processing unit 271) is started.

The timer processing unit 272 activates a timer (not illustrated) to measure the passage of a predetermined time. When the timer detects the passage of the predetermined time, a timeout is output. When a timeout is output, the timer processing unit 272 notifies the third read processing unit 271 of the timeout.

When the timeout is notified from the timer processing unit 272, the third read processing unit 271 reads shared data stored in the data sharing area 521 of the shared memory 520. The shared data read from the data sharing area 521 is moved to, for example, an area for the OS for NAS 300 provided in the shared memory 520 before being used by the OS for NAS 300.

That is, data of the data sharing area 521 of the shared memory 520 is read by the third reception processing unit 27 based on polling.

The mode check unit 25 checks operation mode information stored in the mode information storage area 524 of the shared memory 520. That is, the mode check unit 25 reads the operation mode information from the mode information storage area 524 to check whether the mode information is the IPI mode or the polling mode. The mode check unit 25 checks the operation mode information each time the second read processing unit 261 or the third read processing unit 271 described above reads shared data from the data sharing area 521 of the shared memory 520.

If the mode check unit 25 checks and confirms that the operation mode is the polling mode, the third reception processing unit 27 described above reads shared data stored in the data sharing area 521 of the shared memory 520 by polling.

(B) Operation

The inter-GOS communication from the OS for NAS 300 to the OS for SAN 400 by the inter-GOS communication unit 500 of the storage apparatus 1 as an example of an embodiment configured as described above will be described using FIG. 9.

In the initial state, the transmission counter value in the transmission counter value storage area 522 of the shared memory 520 and the reception counter value in the reception counter value storage area 523 are each reset.

In the OS for NAS 300 on the transmitting side, the first storage processing unit 111 stores shared data in the data sharing area 521 of the shared memory 520 (see symbol S1). Also, the transmission counter update unit 112 increments (+1) the transmission counter value in the transmission counter value storage area 522 of the shared memory 520 (see symbol S2).

In the OS for SAN 400 on the receiving side, the update determination unit 122 compares the transmission counter value stored in the transmission counter value storage area 522 and the reception counter value stored in the reception counter value storage area 523 (see symbol S3). Then, if the transmission counter value and the reception counter value mismatch, the update determination unit 122 determines that shared data transmitted from the OS for NAS 300 is stored in the data sharing area 521.

If the update determination unit 122 determines that there is a difference (mismatch) between the transmission counter value and the reception counter value, the reception counter update unit 123 increments (+1) the reception counter value in the reception counter value storage area 523 (see symbol S4).

The update determination unit 122 calls (see symbol S5) a reception processing task (reception processing function) and the process of the first read processing unit 121 is thereby started. The first read processing unit 121 reads shared data in the data sharing area 521 from the data sharing area 521 of the shared memory 520 (see symbol S6).

In this manner, transmission of shared data from the OS for NAS 300 to the OS for SAN 400 is performed by the inter-GOS communication unit 500.

Next, the inter-GOS communication from the OS for SAN 400 to the OS for NAS 300 by the inter-GOS communication unit 500 of the storage apparatus 1 as an example of an embodiment will be described using FIGS. 10A and 10B.

Figure 10:
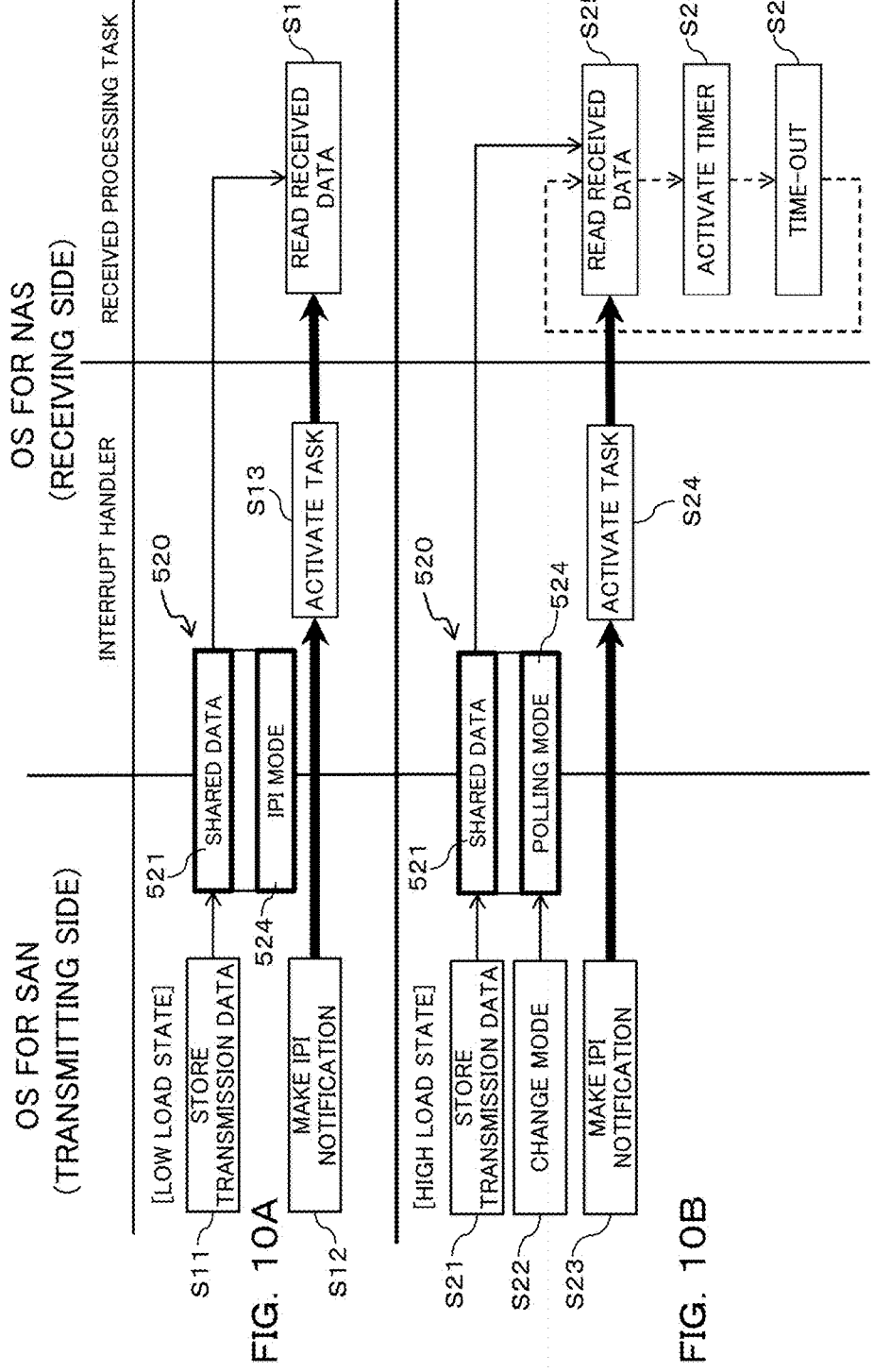
FIGS. 10A and 10B are diagrams illustrating inter-GOS communication from OS for SAN to OS for NAs by the inter-GOS communication unit of the storage apparatus as an example of an embodiment.

FIG. 10A is a diagram illustrating inter-GOS communication in a low-load state of the OS for SAN 400 and FIG. 10B is a diagram illustrating the inter-GOS communication when the OS for SAN 400 changes from a low-load state to a high-load state.

In the initial state, the transmission counter value in the transmission counter value storage area 522 of the shared memory 520 and the reception counter value in the reception counter value storage area 523 are each reset.

In the OS for SAN 400 on the transmitting side, the load determination unit 21 determines the load state of the OS for SAN 400. That is, for example, the load determination unit 21 calculates the number of times of transmission per second (number of times of transmission/sec) of shared data from the OS for SAN 400 to the OS for NAS 300 as the load state value. Then, the load determination unit 21 compares the calculated load state value with the threshold T and if the load state value is equal to or more than the threshold T, determines that the OS for SAN 400 is in a high-load state, and if the load state value is less than the threshold T, determines that the OS for SAN 400 is in a low-load state.

If the load determination unit 21 determines that the OS for SAN 400 is in a low-load state, the inter-GOS communication from the OS for SAN 400 to the OS for NAS 300 is performed in IPI mode and if the load determination unit 21 determines that the OS for SAN 400 is in a high-load state, the inter-GOS communication from the OS for SAN 400 to the OS for NAS 300 is performed in polling mode.

As illustrated in FIGS. 10A and 10B, the mode setting unit 232 sets a value indicating the polling mode to the mode information storage area 524 of the shared memory 520 if the OS for SAN 400 is in a high-load state and sets a value indicating the IPI mode if the OS for SAN 400 is in a low-load state as operation mode information.

In the inter-GOS communication from the OS for SAN 400 to the OS for NAS 300 in IPI mode, the second storage processing unit 221 of the second transmission processing unit 22 stores shared data in the data sharing area 521 of the shared memory 520 (see symbol S11) and the IPI notification unit 222 makes IPI notification to the inter-GOS communication driver 510a of the OS for NAS 300 (see symbol S12).

In the OS for NAS 300 having received the IPI notification, an interrupt handler activates a reception processing task (see symbol S13). That is, the second read processing unit 261 of the second reception processing unit 26 reads data stored in the data sharing area 521 of the shared memory 520 (see symbol S14).

In this manner, transmission of shared data from the OS for SAN 400 to the OS for NAS 300 in IPI mode is performed by the inter-GOS communication unit 500.

On the other hand, if the load determination unit 21 determines that the OS for SAN 400 is in a high-load state, the inter-GOS communication from the OS for SAN 400 to the OS for NAS 300 is performed in polling mode. That is, if the load determination unit 21 determines that the OS for SAN 400 is in a high-load state while communication of shared data in IPI mode is performed, a change to the polling mode is made.

In the inter-GOS communication from the OS for SAN 400 to the OS for NAS 300 in polling mode, the third storage processing unit 231 of the third transmission processing unit 23 stores shared data in the data sharing area 521 of the shared memory 520 (see symbol S21). The mode change is made by a value indicating the polling mode being set to the mode information storage area 524 of the shared memory 520 to which the IPI mode is set as operation mode information by the mode setting unit 232 (see symbol S22).

Then, the IPI notification unit 233 makes IPI notification to the inter-GOS communication driver 510a of the OS for NAS 300 (see symbol S23).

In the OS for NAS 300 on the receiving side that has received the IPI notification, an interrupt handler activates a reception processing task (see symbol S24).

In the reception processing task of the OS for NAS 300, the third read processing unit 271 of the third reception processing unit 27 checks whether shared data is stored in the data sharing area 521 of the shared memory 520 and if shared data is stored, reads the shared data from the data sharing area 521 (see symbol S25).

Whether shared data is stored in the data sharing area 521 can be determined by using any known technique. For example, the third storage processing unit 231 sets a predetermined flag when storing shared data in the data sharing area 521 and deletes the flag when the third read processing unit 271 reads the shared data. In this manner, the third read processing unit 271 can easily determine whether shared data is stored in the data sharing area 521 by checking whether the flag is set.

The timer processing unit 272 starts to measure time by activating the timer (see symbol S26). When the passage of a predetermined time is detected, a timeout is output (see symbol S27) and the third read processing unit 271 reads data stored in the data sharing area 521 of the shared memory 520 (see symbol S25).

Hereinafter, if the high-load state of the OS for SAN 400 continues, only the storage of shared data in the data sharing area 521 by the third storage processing unit 231 described above is performed (see symbol S21) in the OS for SAN 400 (inter-GOS communication driver 510b) and execution of processes of symbols S22 and S23 is inhibited. That is, if the high-load state of the OS for SAN 400 continues in polling mode, an IPI notification from the OS for SAN 400 to the OS for NAS 300 is not issued. Accordingly, overheads such as the time needed to transmit the IPI notification can be reduced and processing performance in inter-GOS communication can be improved.

In polling mode, the third reception processing unit 27 checks whether shared data is stored in the data sharing area 521 of the shared memory 520 also when shared data is transmitted from the first transmission processing unit 11 of the OS for NAS 300. If, as a result of the checking, shared data is stored in the data sharing area 521, a reception processing task is activated to perform processes indicated by symbols S25 to S27.

In this manner, transmission of shared data from the OS for SAN 400 to the OS for NAS 300 in polling mode is performed by the inter-GOS communication unit 500.

If the load of the OS for SAN 400 decreases in polling mode to change to a low-load state, the operation mode is changed to the IPI mode.

Figure 11:
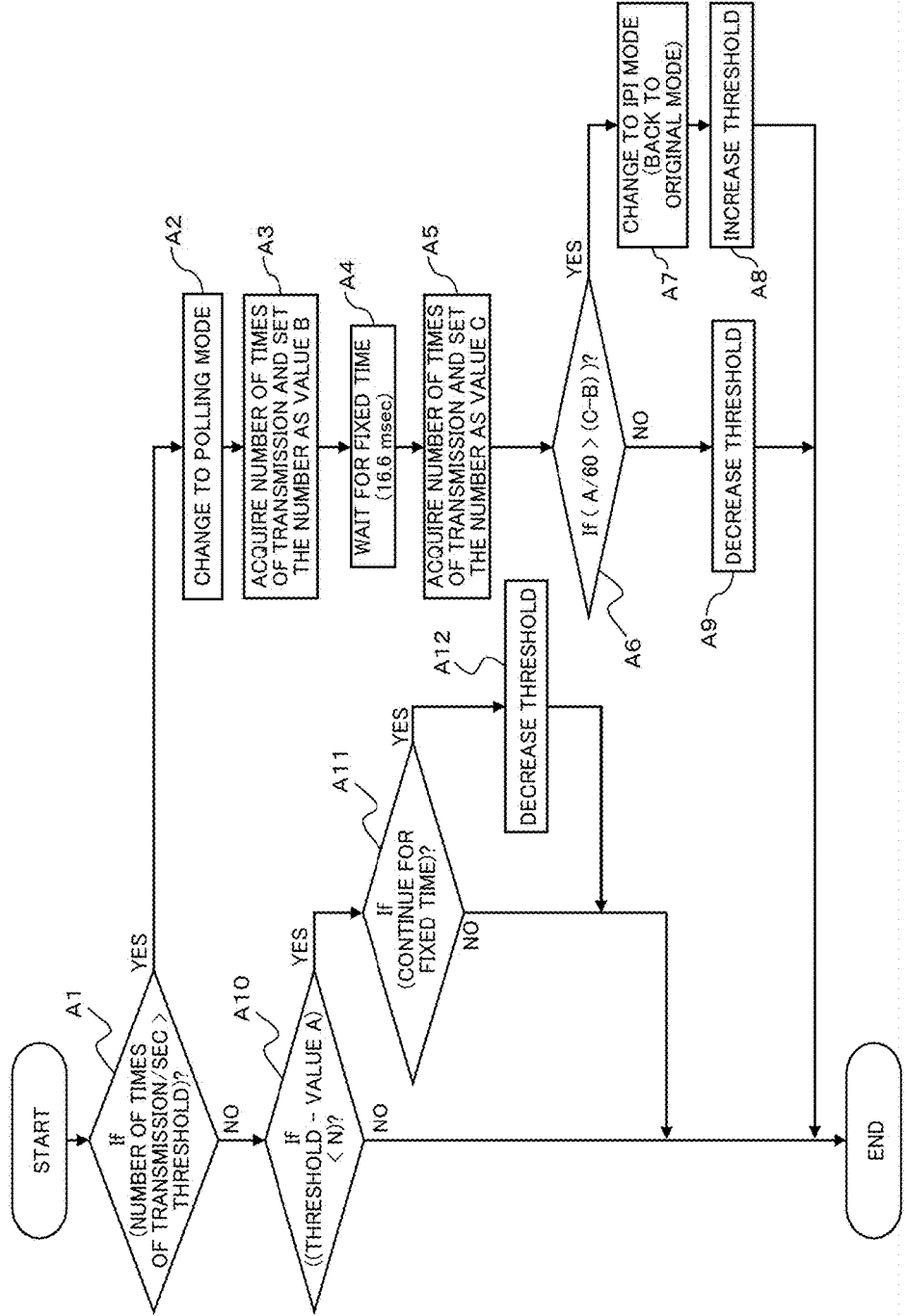
FIG. 11 is a flow chart illustrating a process of changing from an IPI mode to a polling mode during data communication from OS for SAN to OS for NAS in the storage apparatus as an example of an embodiment.

Next, the process for changing from the IPI mode to the polling mode during data communication from the OS for SAN 400 to the OS for NAS 300 in the storage apparatus 1 as an example of an embodiment will be described according to the flow chart (steps A1 to A12) illustrated in FIG. 11 with reference to FIGS. 12 and 13.

Figure 12:
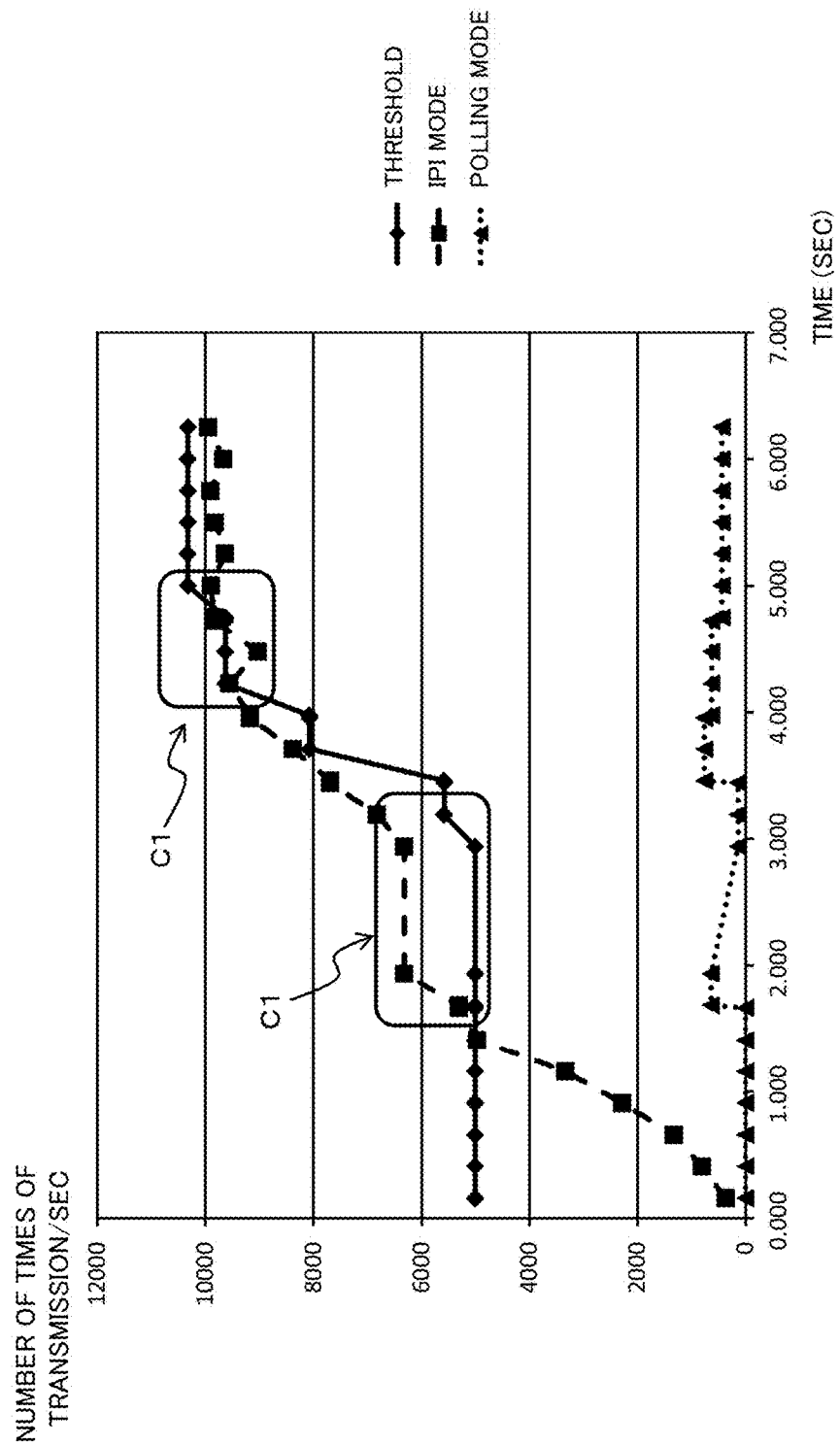
FIG. 12 is a diagram illustrating an actual measurement example of the number of times of transmission of shared data from OS for SAN to OS for NAS in the storage apparatus as an example of an embodiment.
Figure 13:
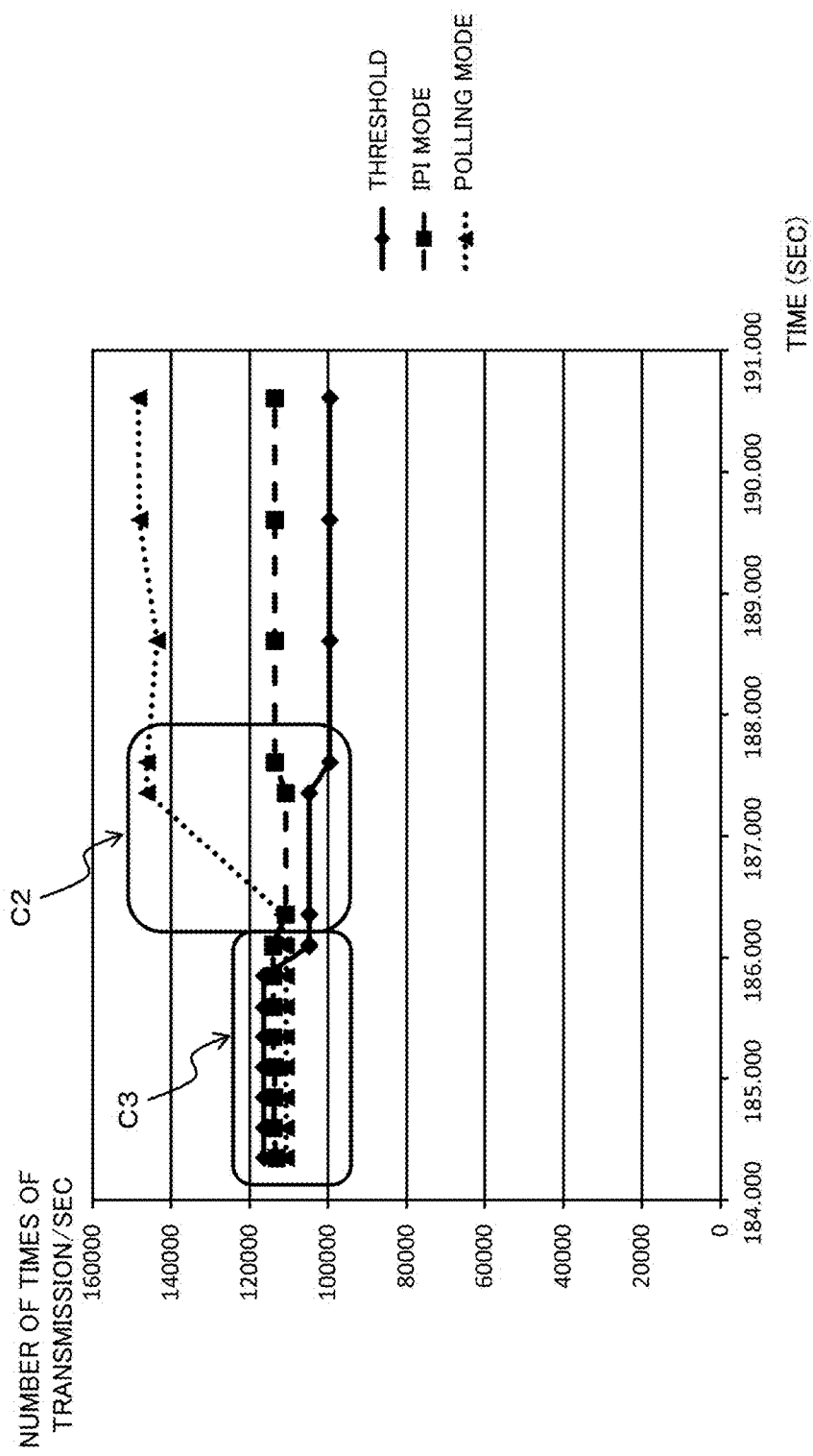
FIG. 13 is a diagram illustrating an actual measurement example of the number of times of transmission of the shared data from OS for SAN to OS for NAS in the storage apparatus as an example of an embodiment.

FIGS. 12 and 13 are diagrams each illustrating an actual measurement example of the number of times of transmission of shared data from the OS for SAN 400 to the OS for NAS 300 in the storage apparatus 1 as an example of an embodiment and show actual numbers of the number of times of transmission of shared data per second in IPI mode and polling mode as graphs together with the threshold T. In FIGS. 12 and 13, the horizontal axis represents the time (unit: sec) and the vertical axis represents the number of times of transmission (unit: number of times) per second.

In step A1, the load determination unit 21 calculates the number of times of transmission per second (number of times of transmission/sec) of shared data from the OS for SAN 400 to the OS for NAS 300 as a load state value A and compares the calculated load state value A with the threshold T. That is, the load determination unit 21 checks whether the load state value A is larger than the threshold T.

If the load state value A is larger than the threshold T (see YES route in step A1), the OS for SAN 400 is in a high-load state. In this case, in step A2, the mode setting unit 232 changes the IPI mode to the polling mode. That is, the mode setting unit 232 changes the operation mode information stored in the mode information storage area 524 of the shared memory 520 from the IPI mode to the polling mode.

Accordingly, the third transmission processing unit 23 of the OS for SAN 400 transmits shared data and the third reception processing unit 27 of the OS for NAS 300 receives the shared data.

In step A3, the threshold update unit 24 acquires the number of times of shared data being transmitted from the OS for SAN 400 to the OS for NAS 300 in polling mode and sets the number of times of transmission as a value B (number of times of transmission B).

Then, after waiting for a fixed time (for example, 16.6 msec) in step A4, in step A5, the threshold update unit 24 acquires the number of times of shared data being transmitted from the OS for SAN 400 to the OS for NAS 300 in polling mode and sets the number of times of transmission as a value C (number of times of transmission C). 16.6 msec is a value that approximates 1/60 sec and is used in step A6 described below as a reference time to determine an effect due to the change to the polling mode in step A5.

In step A6, the threshold update unit 24 determines an effect after changing to the polling mode in step A2.

More specifically, the threshold update unit 24 compares a value (A/60) obtained by dividing the load state value A by 60 and a difference (C−B) between the value C and the value B. That is, the threshold update unit 24 determines whether (A/60) is larger than (C−B).

Here, the value (A/60) represents the number of times of transmission of shared data per reference time (16.6 msec) before changing to the polling mode in step A2. The value (C−B) represents the number of times of transmission of shared data per reference time (16.6 msec) after changing to the polling mode in step A2.

If (A/60) is larger than (C−B) (see YES route in step A6), it can be determined that there is no effect of changing to the polling mode in step A2. Thus, in step A7, the mode setting unit 232 changes the polling mode to the IPI mode to restore the original operation mode.

In step A8, the threshold update unit 24 increases the value of the threshold T by a predetermined value specified in advance. Hereinafter, the operation mode can thereby be inhibited from being changed to the polling mode under similar loads so that the threshold T is optimized.

In the example illustrated in FIG. 12, the value of the threshold T is increased in each portion indicated by symbol C1.

In step A8, how much to increase the threshold T can appropriately be changed and used. Then, the process is terminated.

On the other hand, if, as a result of comparison in step A6, (A/60) is equal to or less than (C−B) (see NO route in step A6), it can be determined that an effect of changing to the polling mode in step A2 is exhibited. Thus, the polling mode is not changed to the IPI mode.

In step A9, the threshold update unit 24 decreases the value of the threshold T by a predetermined value specified in advance. Hereinafter, the operation mode can thereby be changed to the IPI mode before similar loads arise so that the threshold T is optimized.

In the example illustrated in FIG. 13, the value of the threshold T is decreased in a portion indicated by symbol C2.

In step A9, how much to decrease the threshold T can also be appropriately changed and used. Then, the process is terminated.

If, as a result of comparison in step A1, the load state value A is equal to or less than the threshold T (see NO route in step A1), in step A10, whether a difference (T−A) of the threshold T and the load state value A is smaller than a predetermined reference value N. If the difference (T−A) of the threshold T and the load state value A is equal to or more than the predetermined reference value N (see NO route in step A10), the process is terminated.

If the difference (T−A) of the threshold T and the load state value A is less than the predetermined reference value N (see YES route in step A10), the process proceeds to step A11. In step A11, whether a state in which the difference (T−A) of the threshold T and the load state value A is less than the predetermined reference value N continues for a fixed time or longer is determined.

If the state in which the difference (T−A) of the threshold T and the load state value A is less than the predetermined reference value N continues for a fixed time or longer (see YES route in step A11), this means that a state of the load a little below the threshold T continues for a fixed time or longer. In such a case, in step A12, the threshold update unit 24 decreases the value of the threshold T by a predetermined value specified in advance.

By decreasing the threshold T in this manner, the operation mode is more likely to be changed to the polling mode and processes of steps A2 to A9 described above are allowed to be performed actively to change to the polling mode so that the threshold T is optimized.

In the example illustrated in FIG. 13, the value of the threshold T is decreased in a portion indicated by symbol C3.

In step A12, how much to decrease the threshold T can also be appropriately changed and used. Then, the process is terminated. If, in step A11, the state in which the difference (T−A) of the threshold T and the load state value A is less than the predetermined reference value N does not continue for a fixed time or longer (see NO route in step A11), the high-load state is considered to be temporary and the process is terminated.

Figure 14:
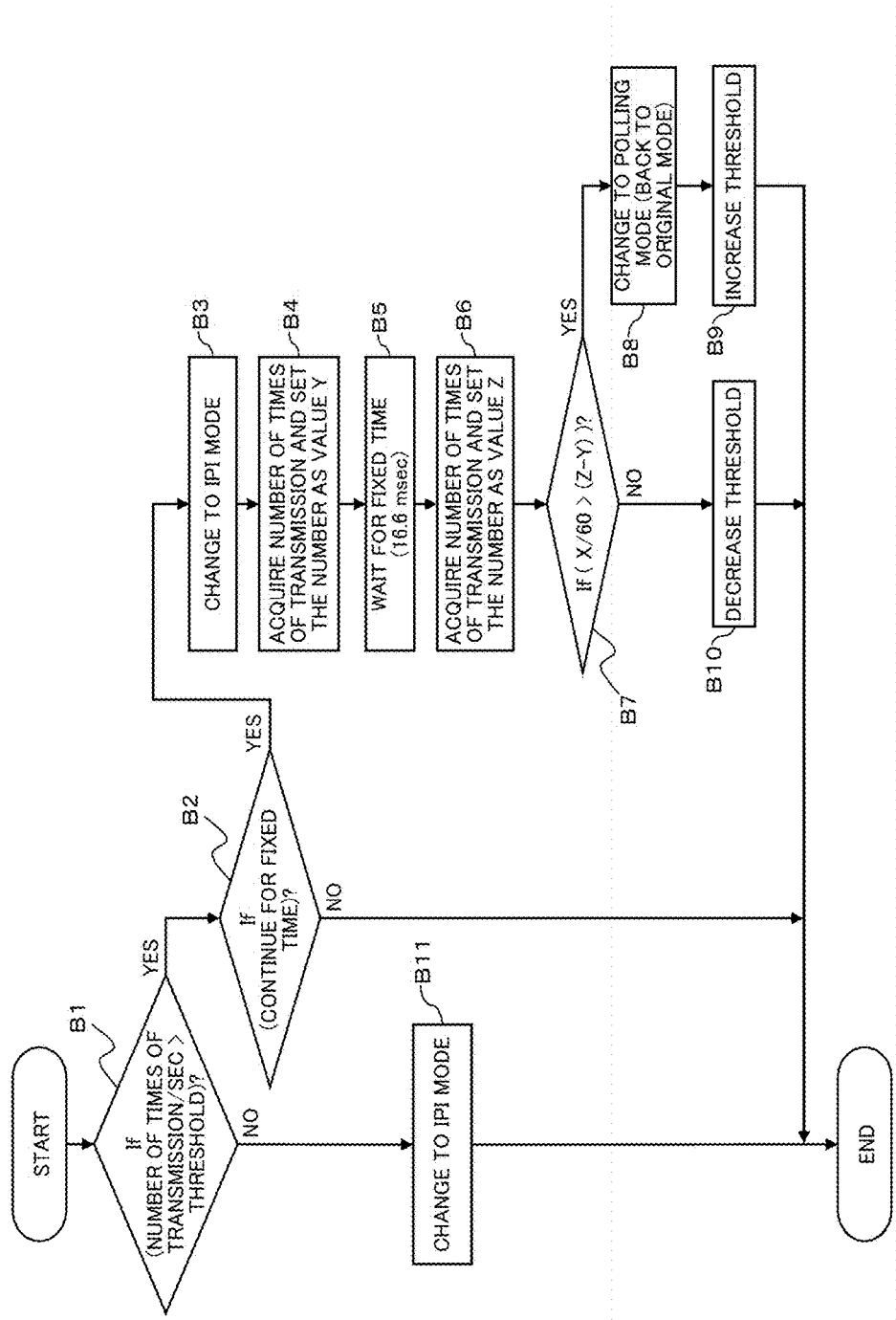
FIG. 14 is a flow chart illustrating a process of changing from the polling mode to the IPI mode during data communication from OS for SAN to OS for NAS in the storage apparatus as an example of an embodiment.

Next, the process for changing from the polling mode to the IPI mode during data communication from the OS for SAN 400 to the OS for NAS 300 in the storage apparatus 1 as an example of an embodiment will be described according to the flow chart (steps B1 to B11) illustrated in FIG. 14 with reference to FIGS. 15 to 17.

Figure 15:
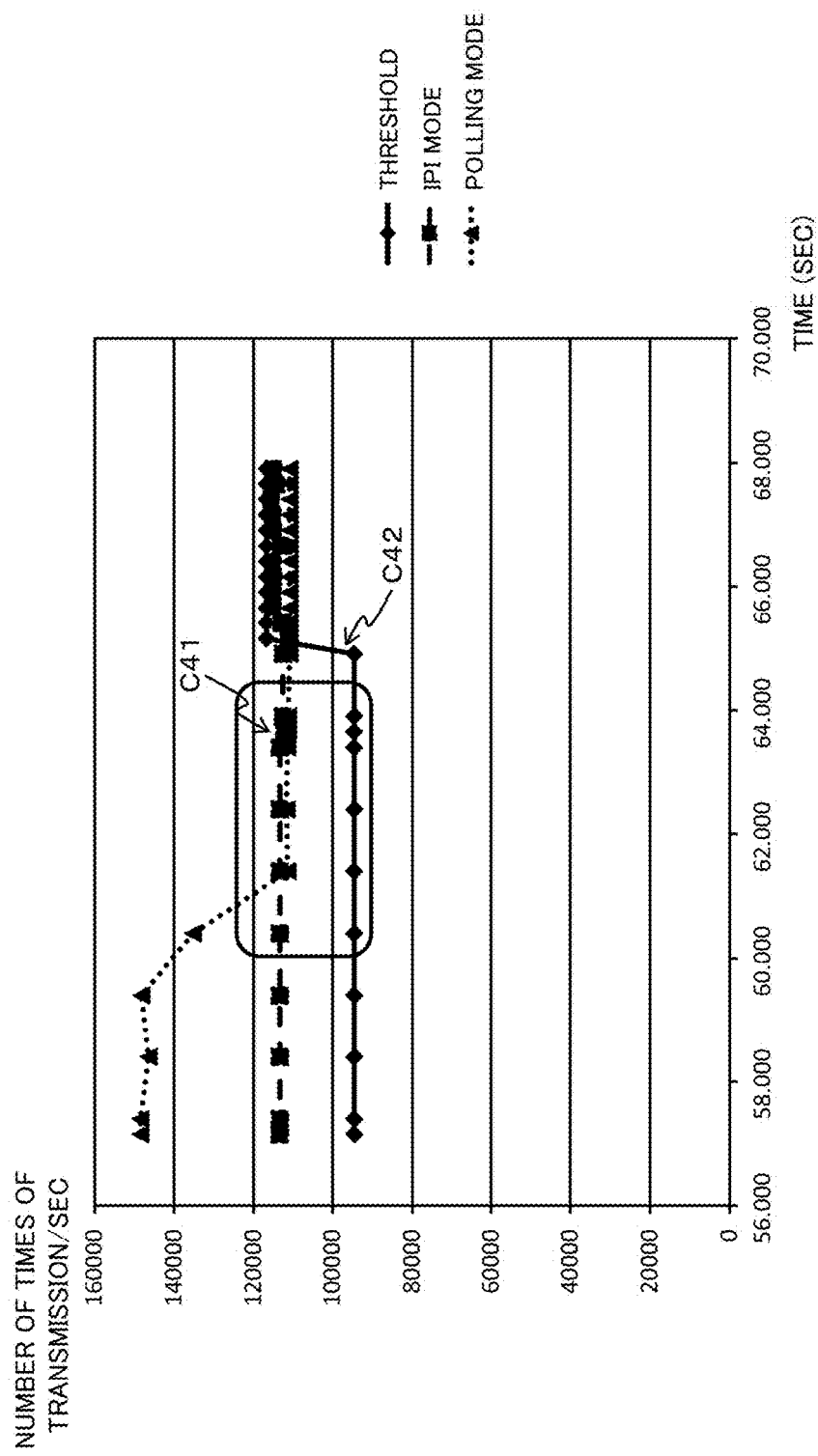
FIG. 15 is a diagram illustrating an actual measurement example of the number of times of transmission of the shared data from OS for SAN to OS for NAS in the storage apparatus as an example of an embodiment.

FIGS. 15 to 17 are diagrams each illustrating an actual measurement example of the number of times of transmission of shared data from the OS for SAN 400 to the OS for NAS 300 in the storage apparatus 1 as an example of an embodiment and show actual numbers of the number of times of transmission of shared data per second in IPI mode and polling mode as graphs together with the threshold T. In FIG. 16, however, the number of times of transmission per second in polling mode and the threshold T are illustrated. In FIGS. 15 to 17, the horizontal axis represents the time (unit: sec) and the vertical axis represents the number of times of transmission (unit: number of times) per second.

In step B1, the load determination unit 21 calculates the number of times of transmission per second (number of times of transmission/sec) of shared data from the OS for SAN 400 to the OS for NAS 300 as a load state value X and compares the calculated load state value X with the threshold T. That is, the load determination unit 21 checks whether the load state value X is larger than the threshold T.

If the load state value X is larger than the threshold T (see YES route in step B1), the OS for SAN 400 is in a high-load state. Next, in step B2, whether the high-load state continues for a fixed time or longer is determined. If the high-load state does not continue for a fixed time or longer (see NO route in step B2), the high-load state is considered to be temporary and the process is terminated.

If the high-load state continues for a fixed time or longer (see YES route in step B2), in step B3, the mode setting unit 232 changes the polling mode to the IPI mode. That is, the mode setting unit 232 changes the operation mode information stored in the mode information storage area 524 of the shared memory 520 from the polling mode to the IPI mode.

Accordingly, the second transmission processing unit 22 of the OS for SAN 400 transmits shared data and the second reception processing unit 26 of the OS for NAS 300 receives the shared data.

In step B4, the threshold update unit 24 acquires the number of times of shared data being transmitted from the OS for SAN 400 to the OS for NAS 300 in IPI mode and sets the number of times of transmission as a value Y (number of times of transmission Y).

Then, after waiting for a fixed time (for example, 16.6 msec) in step B5, in step B6, the threshold update unit 24 acquires the number of times of shared data being transmitted from the OS for SAN 400 to the OS for NAS 300 in IPI mode and sets the number of times of transmission as a value Z (number of times of transmission Z). 16.6 msec is a value that approximates 1/60 sec and is used in step B7 described below as a reference time to determine an effect due to the change to the IPI mode in step B3.

In step B7, the threshold update unit 24 determines an effect after changing to the IPI mode in step B3.

More specifically, the threshold update unit 24 compares a value (X/60) obtained by dividing the load state value X by 60 and a difference (Z−Y) between the value Z and the value Y. That is, the threshold update unit 24 determines whether (X/60) is larger than (Z−Y).

Here, the value (X/60) represents the number of times of transmission of shared data per reference time (16.6 msec) before changing to the IPI mode in step B3. The value (Z−Y) represents the number of times of transmission of shared data per reference time (16.6 msec) after changing to the IPI mode in step B3.

If (X/60) is larger than (Z−Y) (see YES route in step B7), it can be determined that there is no effect of changing to the IPI mode in step B3. Thus, in step B8, the mode setting unit 232 changes the IPI mode to the polling mode to restore the original operation mode.

In step B9, the threshold update unit 24 increases the value of the threshold T by a predetermined value specified in advance. Hereinafter, the operation mode can thereby be inhibited from being changed to the polling mode under similar loads so that the threshold T is optimized.

In the example illustrated in FIG. 15, the operation mode is changed to the IPI mode in a portion indicated by symbol C41. Accordingly, a case when the number of times of transmission per second in IPI mode exceeds the threshold T may arise and in such a case, the threshold T is increased by the process in step A8 in FIG. 11 described above (see symbol C42) so that the threshold T is optimized.

In step B9, how much to increase the threshold T can appropriately be changed and used. Then, the process is terminated.

On the other hand, if, as a result of comparison in step B7, (X/60) is equal to or less than (Z−Y) (see NO route in step B7), it can be determined that an effect of changing to the IPI mode in step B3 is exhibited. Thus, the IPI mode is not changed to the polling mode.

In step B10, the threshold update unit 24 decreases the value of the threshold T by a predetermined value specified in advance. Hereinafter, the operation mode can be changed to the IPI mode under similar loads so that the threshold T is optimized.

In the example illustrated in FIG. 16, the value of the threshold T is decreased in a portion indicated by symbol C5. Thus, if the number of times of transmission per second in IPI mode falls short of the threshold T significantly, the threshold T is decreased.

In step B10, how much to decrease the threshold T can also be appropriately changed and used. Then, the process is terminated.

If, as a result of comparison in step B1, the load state value X is equal to or less than the threshold T (see NO route in step B1), in step B11, the mode setting unit 232 changes the polling mode to the IPI mode. That is, the mode setting unit 232 changes the operation mode information stored in the mode information storage area 524 of the shared memory 520 from the polling mode to the IPI mode.

In the example illustrated in FIG. 17, the operation mode is changed to the IPI mode in a portion indicated by symbol C6.

(C) Effect

Thus, according to the storage apparatus 1 as an example of an embodiment, in data communication from the OS for NAS 300 to the OS for SAN 400, the first storage processing unit 111 of the first transmission processing unit 11 stores shared data in the data sharing area 521 of the shared memory 520 and the first reception processing unit 12 reads the shared data stored in the data sharing area 521 based on polling.

That is, when the update determination unit 122 determines that the data sharing area 521 has been updated, the first read processing unit 121 performs inter-GOS communication from the OS for NAS 300 to the OS for SAN 400 by reading the shared data from the data sharing area 521.

Accordingly, there is no need to make IPI notification from the OS for NAS 300 and a speedup can be achieved by reducing the time needed for inter-GOS communication.

In the first transmission processing unit 11, when the first storage processing unit 111 stores shared data in the shared memory 520, the transmission counter update unit 112 increments the transmission counter value in the transmission counter value storage area 522 of the shared memory 520.

Then, in the first reception processing unit 12, the update determination unit 122 compares the transmission counter value in the transmission counter value storage area 522 of the shared memory 520 and the reception counter value in the reception counter value storage area 523. Then, if these counter values mismatch, the update determination unit 122 determines that shared data is newly stored in the data sharing area 521 of the shared memory 520.

Also in the first reception processing unit 12, the reception counter update unit 123 increments the reception counter value in the reception counter value storage area 523 of the shared memory 520 and reads the shared data from the data sharing area 521 of the shared memory 520.

Therefore, data communication from the OS for NAS 300 to the OS for SAN 400 can be performed at high speed without making IPI notification.

To make IPI notification, it is necessary to request IPI issuance via a register of the CPU 110. In contrast, for example, the increment (see symbol S2 in FIG. 9) of the transmission counter value in the transmission counter value storage area 522 is completed by accessing a memory once. Such memory access is fast when compared with register access of the CPU 110.

Figure 9:
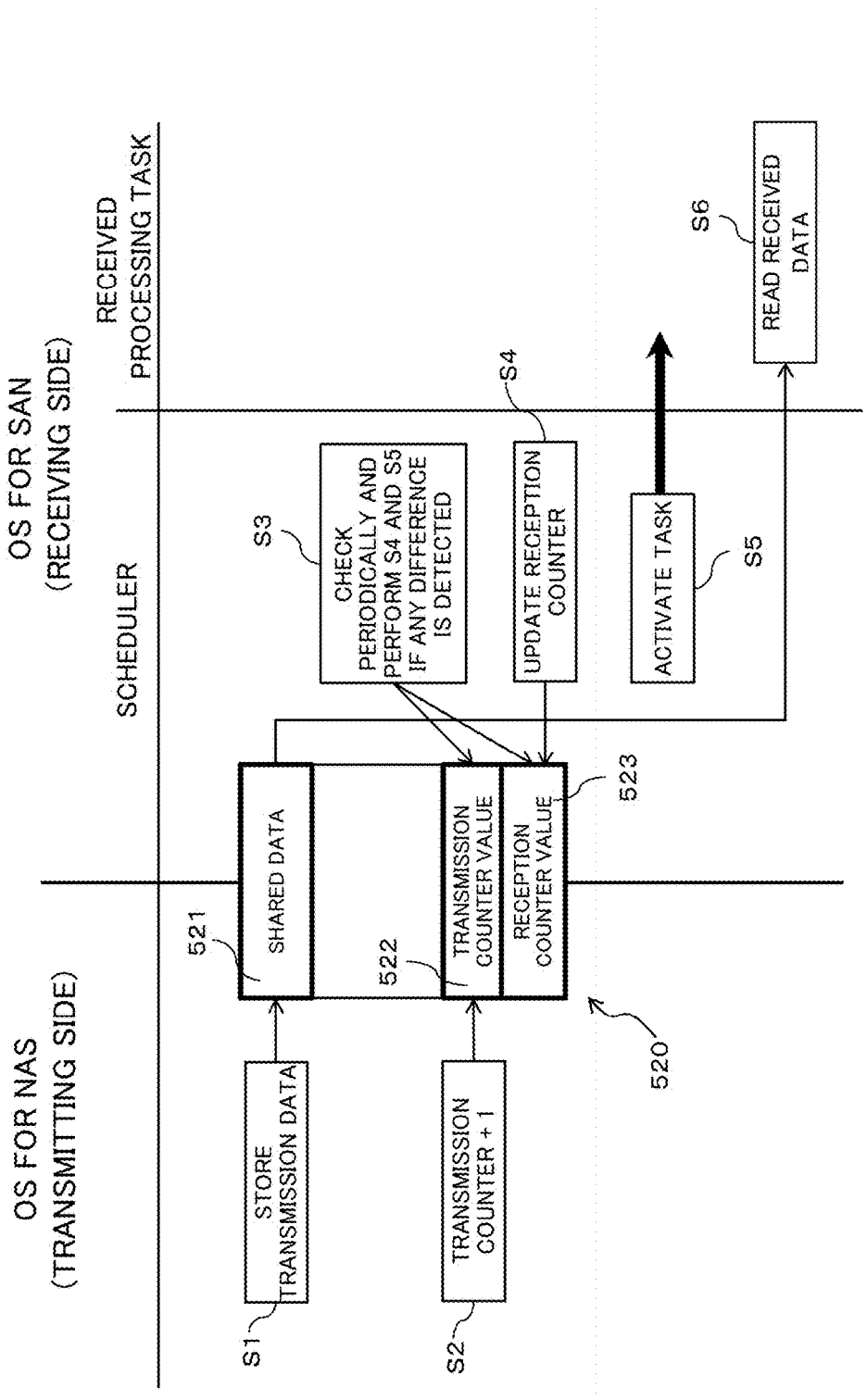
FIG. 9 is a diagram illustrating inter-GOS communication from OS for NAS to OS for SAN by an inter-GOS communication unit of the storage apparatus as an example of an embodiment.

The update of the reception counter value and activation (call) of a reception processing task indicated in symbols S4 and S5 in FIG. 9 respectively can be completed by accessing a memory several times. In addition, there is no possibility of an occurrence of context switch to tasks, which may occur when IPI notification is received and processed. Here, the context switch means switching of resources such as a stack pointer and a register of the CPU 110, for example. A huge number of times of memory access and CPU register access arise for context switches from IPI notification to tasks, which causes a delay in data transmission processing.

In the present storage apparatus 1, a context switch to tasks, which may arise when IPI notification is received and processed, does not arise and data communication from the OS for SAN 400 to the OS for NAS 300 can also thereby be made faster.

Also according to the present storage apparatus 1, when the OS for SAN 400 is in a low-load state, data communication from the OS for SAN 400 to the OS for NAS 300 is performed in IPI mode.

When the OS for SAN 400 is in a low-load state, there is room for capabilities of the CPU 110 and the like and the influence of degradation in processing performance is small even if communication of shared data is performed in IPI mode.

When the OS for SAN 400 is in a high-load state, data communication from the OS for SAN 400 to the OS for NAS 300 is performed in polling mode. That is, overheads of IPI notification can be reduced by inhibiting the IPI notification by the IPI notification unit 233 so that the communication of shared data can be processed at high speed. When the OS for SAN 400 of the shared memory 520 by the mode setting unit 232 is in a high-load state, the storage of mode information in the mode information storage area 524 by the mode setting unit 232 is also inhibited and overheads in the OS for SAN 400 can also thereby be reduced so that communication of shared data can be processed at high speed.

In the data communication from the OS for SAN 400 to the OS for NAS 300, the functions as the mode check unit 25, the second reception processing unit 26, and the third reception processing unit 27 are implemented at an application level. Accordingly, there is no need to change the Linux kernel when Linux is used as the OS for NAS 300. Therefore, there is no need to release source code according to GPL (General Public License).

If the mode setting unit 232 changes the operation mode during data communication from the OS for SAN 400 to the OS for NAS 300, an effect of the operation mode change is evaluated by the numbers of times of transmission of shared data per reference time before and after the operation mode change being compared by the threshold update unit 24. Then, if the number of times of transmission of shared data per reference time before the operation mode change is larger than that after the operation mode change, an effect due to the operation mode change is not considered to be achieved and the operation mode before the change is restored. Accordingly, the optimum operation mode can be selected and run so that inter-GOS communication can efficiently be performed.

If an effect due to the operation mode change is not obtained as described above, the threshold update unit 24 increases the value of the threshold T by a predetermined value specified in advance. Hereinafter, the operation mode can thereby be inhibited from being changed under similar loads so that the threshold T is optimized.

On the other hand, if an effect due to the operation mode change is obtained, the threshold update unit 24 decreases the value of the threshold T by a predetermined value specified in advance. Hereinafter, the operation mode can thereby be changed to the IPI mode before similar loads arise so that the threshold T is optimized.

With the above disclosure, the present embodiment can be carried out and produced by people skilled in the art.

(D) Others

The disclosed technology is not limited to the above embodiment and can be carried out in various modifications without deviating from the spirit of the present embodiment. Each component and each process of the present embodiment can be selected as needed or appropriately combined.

In the above embodiment, for example, an example in which Linux as OS for NAS is used as the first virtual OS and VxWorks as OS for SAN is used as the second virtual OS is shown, but the present embodiment is not limited to such an example and can be carried out in various modifications such as using other OS.

Also in the above embodiment, the threshold update unit 24 uses the number of times of transmission of shared data per reference time as the load state value before and after the operation mode change, but the present embodiment is not limited to such an example and can be carried out in various modifications using, for example, the usage rate of the CPU 110 or the usage rate of the memory 106.

Also in the above embodiment, the same threshold T is used for transmission of shared data from the OS for SAN 400 to the OS for NAS 300 and transmission of shared data from the OS for NAS 300 to the OS for SAN 400, but the present embodiment is not limited to such an example and can be carried out in various modifications by setting respective thresholds.

Also in the above embodiment, the third storage processing unit 231 sets a predetermined flag when storing shared data in the data sharing area 521 and the third read processing unit 271 deletes the flag when reading the shared data. Then, whether shared data is stored in the data sharing area 521 is determined by the third read processing unit 271 by checking whether the flag is set, but the present embodiment is not limited to such an example. For example, the third transmission processing unit may include a function similar to that of the transmission counter update unit 112 and also the third reception processing unit 27 may include functions similar to those of the reception counter update unit 123 and the update determination unit 122 and other various modifications can be made.

According to an embodiment, processing performance in inter-virtual OS communication can be improved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus executing a first virtual operating system (OS) and a second virtual OS, the apparatus comprising:
    a shared memory accessible from each of the first virtual OS and the second virtual OS;
    a first storage processing unit that stores shared data in a data sharing area of the shared memory and a first counter value update unit that increments a first counter value stored in the shared memory when the shared data is stored in the data sharing area in the first virtual OS, the first virtual OS transmitting the shared data;
    an update determination unit that periodically checks an update state of the data sharing area and a second counter value update unit that increments a second counter value stored in the shared memory when the shared data is read from the data sharing area in the second virtual OS, the second virtual OS receiving the shared data; and
    a first read processing unit that reads the shared data from the data sharing area when the data sharing area is updated,
    the update determination unit compares the first counter value and the second counter value and determines that the data sharing area has been updated when the first counter value and the second counter value mismatch.

2. The information processing apparatus according to claim 1, wherein the update determination unit further checks the update state of the data sharing area when processes in the second virtual OS are switched.

3. The information processing apparatus according to claim 1, wherein the update determination unit further checks the update state of the data sharing area when the second virtual OS is carrying out no process.

4. An information processing apparatus executing a first virtual operating system (OS) and a second virtual OS, the information processing apparatus comprising:
    a shared memory accessible from each of the first virtual OS and the second virtual OS;
    a second storage processing unit that stores shared data in a data sharing area of the shared memory in the second virtual OS transmitting the shared data to the first virtual OS;
    a notification unit that notifies the first virtual OS that the shared data is stored in the data sharing area through an interrupt signal in the second virtual OS;
    a second read processing unit that reads the shared data from the data sharing area in the first virtual OS; and
    a load determination unit that determines whether a load state value indicating a load state in the second virtual OS is equal to or more than a threshold in the second virtual OS, wherein
    when the load state value in the second virtual OS is equal to or more than the threshold in a determination result by the load determination unit, the shared data is transmitted from the second virtual OS to the first virtual OS in a first mode in which the second storage processing unit stores the shared data in the data sharing area and the second read processing unit periodically reads the shared data from the data sharing area and
    when the load state value in the second virtual OS is less than the threshold in the determination result by the load determination unit, the shared data is transmitted from the second virtual OS to the first virtual OS in a second mode in which the second storage processing unit stores the shared data in the data sharing area, the notification unit notifies the first virtual OS through the interrupt signal, and the second read processing unit reads the shared data from the data sharing area.

5. The information processing apparatus according to claim 4, wherein when an operation mode is changed from the first mode to the second mode or from the second mode to the first mode in the second virtual OS,
    a number of times of transmission of the shared data per reference time before the operation mode is changed and a number of times of transmission of the shared data per reference time after the operation mode is changed is compared and when the number of times of transmission of the shared data per reference time before the operation mode is changed is larger than the number of times of transmission of the shared data per reference time after the operation mode is changed, a state before the operation mode being changed is restored.

6. The information processing apparatus according to claim 5, further comprising: a threshold update unit that, when the number of times of transmission of the shared data per reference time before the operation mode is changed is larger than the number of times of transmission of the shared data per reference time after the operation mode is changed, increases a value of the threshold by a predetermined value.

7. The information processing apparatus according to claim 1, wherein the first virtual OS is an operating system for SAN that exercises SAN control,
    the second virtual OS is an operating system for NAS that exercises NAS control, and
    the information processing apparatus processes communication between a host apparatus and a storage unit.

8. A non-transitory computer-readable recording medium having recorded therein a program for causing a computer to execute a first virtual operating system (OS) and a second virtual OS, wherein the program
    causes the computer to execute processes including:

storing shared data in a data sharing area accessible from each of the first virtual OS and the second virtual OS in the second virtual OS transmitting the shared data to the first virtual OS;

notifying the first virtual OS that the shared data is stored in the data sharing area through an interrupt signal in the second virtual OS;

reading the shared data from the data sharing area in the first virtual OS;

determining whether a load state value indicating a load state in the second virtual OS is equal to or more than a threshold in the second virtual OS;

transmitting, when the load state value in the second virtual OS is equal to or more than the threshold, the shared data from the second virtual OS to the first virtual OS in a first mode in which the shared data is stored in the data sharing area in the second virtual OS and periodically reading the shared data from the data sharing area in the first virtual OS and transmitting, when the load state value in the second virtual OS is less than the threshold, the shared data from the second virtual OS to the first virtual OS in a second mode in which the shared data is stored in the data sharing area in the first virtual OS, notifying the first virtual OS through an interrupt signal in the second virtual OS, and reading the shared data from the data sharing area in the first virtual OS.

9. The non-transitory computer-readable recording medium having recorded therein a program according to claim 8, wherein the program causes the computer to execute processes including: when an operation mode is changed from the first mode to the second mode or from the second mode to the first mode in the second virtual OS, comparing a number of times of transmission of the shared data per reference time before the operation mode is changed and a number of times of transmission of the shared data per reference time after the operation mode is changed and when the number of times of transmission of the shared data per reference time before the operation mode is changed is larger than the number of times of transmission of the shared data per reference time after the operation mode is changed, restoring a state before the operation mode being changed.

10. The non-transitory computer-readable recording medium having recorded therein a program according to claim 9, wherein the program causes the computer to execute processes including:

when the number of times of transmission of the shared data per reference time before the operation mode is changed is larger than the number of times of transmission of the shared data per reference time after the operation mode is changed, increasing a value of the threshold by a predetermined value.

11. An information processing apparatus executing a first virtual operating system (OS) and a second virtual OS, the apparatus comprising:

a shared memory accessible from each of the first virtual OS and the second virtual OS;

a first storage processing unit that stores shared data in a data sharing area of the shared memory in the first virtual OS transmitting the shared data;

an update determination unit that periodically checks an update state of the data sharing area in the second virtual OS receiving the shared data; and a first read processing unit that reads the shared data from the data sharing area when the data sharing area is updated, wherein the update determination unit further checks the update state of the data sharing area at least one of when processes in the second virtual OS are switched and when the second virtual OS is carrying out no process.

* * * * *